(12) United States Patent
Fukumori et al.

(10) Patent No.: US 9,303,725 B2
(45) Date of Patent: Apr. 5, 2016

(54) BICYCLE CHAIN

(71) Applicant: SHIMANO INC., Sakai (JP)

(72) Inventors: Tsuyoshi Fukumori, Sakai (JP);
Takashi Adachi, Sakai (JP)

(73) Assignee: SHIMANO INC., Sakai (JP)

( * ) Notice: Subject to any disclaimer, the term of this patent is extended or adjusted under 35 U.S.C. 154(b) by 343 days.

(21) Appl. No.: 14/038,758

(22) Filed: Sep. 27, 2013

(65) Prior Publication Data

US 2015/0094180 A1    Apr. 2, 2015

(51) Int. Cl.
*F16G 13/06* (2006.01)
*B62M 9/00* (2006.01)

(52) U.S. Cl.
CPC ............ *F16G 13/06* (2013.01); *B62M 9/00* (2013.01); *B62M 2009/005* (2013.01)

(58) Field of Classification Search
CPC ..................................................... F16G 13/18
USPC ......................................................... 474/206
See application file for complete search history.

(56) References Cited

U.S. PATENT DOCUMENTS

| | | | |
|---|---|---|---|
| 4,265,134 A * | 5/1981 | Dupoyet | F16G 13/06 474/231 |
| 4,642,078 A | 2/1987 | Dupoyet | |
| 5,066,265 A * | 11/1991 | Wu | F16G 13/06 474/206 |
| 5,073,153 A * | 12/1991 | Wu | F16G 13/06 474/206 |
| 5,098,349 A | 3/1992 | Wu | |
| 5,151,066 A | 9/1992 | Wu | |
| 5,226,857 A | 7/1993 | Ono et al. | |
| 5,322,482 A | 6/1994 | Wang | |
| 5,322,483 A | 6/1994 | Wang | |
| 5,346,006 A | 9/1994 | Wu | |
| 5,465,568 A * | 11/1995 | Wang | B62M 9/10 474/206 |
| 5,741,196 A | 4/1998 | Campagnolo | |
| 5,879,257 A | 3/1999 | Tanaka | |
| 6,110,064 A | 8/2000 | Guichard | |
| 6,364,799 B1 | 4/2002 | Campagnolo | |

(Continued)

FOREIGN PATENT DOCUMENTS

| | | |
|---|---|---|
| JP | 54-084755 U | 6/1979 |
| JP | 55-151691 U | 11/1980 |

(Continued)

OTHER PUBLICATIONS

Office Action with Form PTO-892 Notice of References Cited issued by the U.S. Patent and Trademark Office for the corresponding U.S. Appl. No. 14/245,035, Jun. 4, 2015.

*Primary Examiner* — William E Dondero
*Assistant Examiner* — Mark K Buse
(74) *Attorney, Agent, or Firm* — Mori & Ward, LLP

(57) ABSTRACT

A bicycle chain comprises a first outer link plate, a first inner link plate, and a first link pin. The first outer link plate comprises a first end portion, a second end portion, and a first intermediate portion. The first end portion includes a first opening having a first center axis. A first outer-link distance is defined from the first center axis to a first end edge. The first inner link plate comprises a third end portion, a fourth end portion, and a second intermediate portion. The third end portion includes a third opening having a third center axis. A first inner-link distance is defined from the third center axis to a third end edge. A second inner-link distance is defined from the third center axis to a third end edge. The first inner-link distance is larger than the second inner-link distance and the first outer-link distance.

24 Claims, 29 Drawing Sheets

(56) References Cited

U.S. PATENT DOCUMENTS

| | | | |
|---|---|---|---|
| 7,267,220 B2 * | 9/2007 | Wang | F16G 13/18 198/850 |
| 7,325,391 B1 * | 2/2008 | Oishi | F16G 13/06 474/206 |
| 7,437,870 B2 * | 10/2008 | Wu | F16G 13/06 474/206 |
| 7,837,584 B2 * | 11/2010 | Wu | F16G 13/06 474/218 |
| 7,946,941 B2 * | 5/2011 | Oishi | F16G 13/06 474/206 |
| 7,963,872 B2 | 6/2011 | Tohara et al. | |
| 8,066,604 B2 | 11/2011 | Righi et al. | |
| 8,157,683 B2 | 4/2012 | Korse | |
| 8,708,850 B2 | 4/2014 | Tohara | |
| 8,734,280 B2 * | 5/2014 | Oishi | F16G 13/06 474/230 |
| 2005/0020394 A1 | 1/2005 | Valle | |
| 2006/0014600 A1 | 1/2006 | Wu | |
| 2011/0183800 A1 | 7/2011 | Tohara | |
| 2012/0322599 A1 * | 12/2012 | Oishi | F16G 13/06 474/230 |

FOREIGN PATENT DOCUMENTS

| | | |
|---|---|---|
| JP | 56-008597 U | 1/1981 |
| JP | 3045399 U | 1/1998 |

* cited by examiner

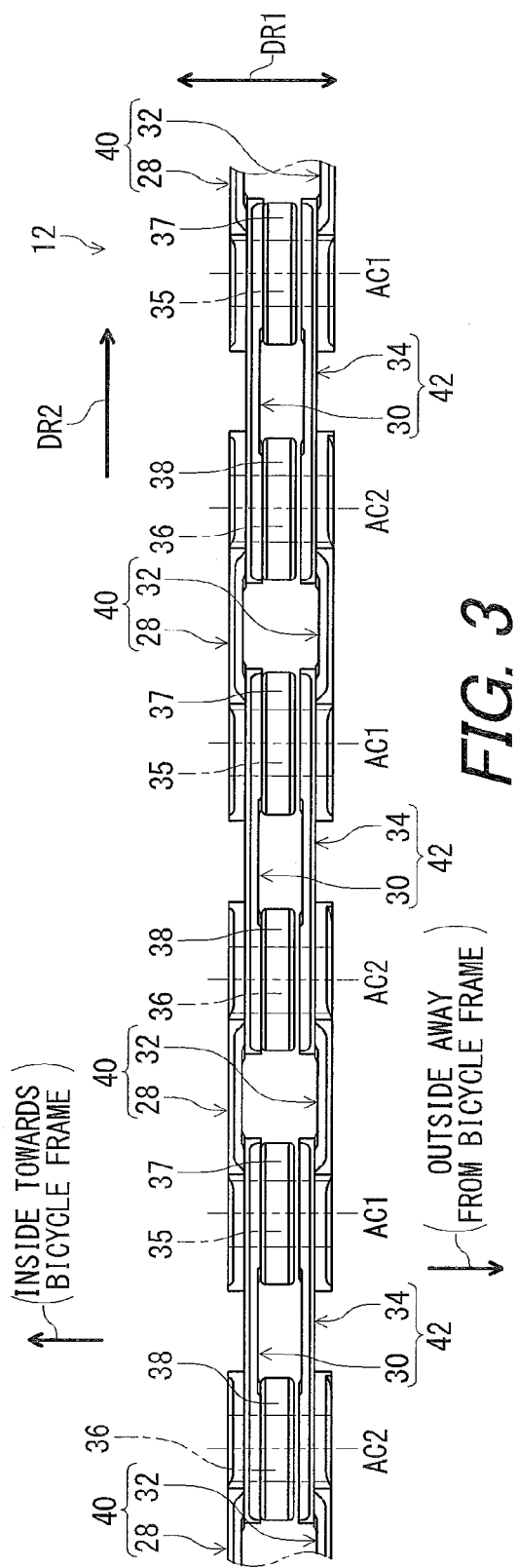
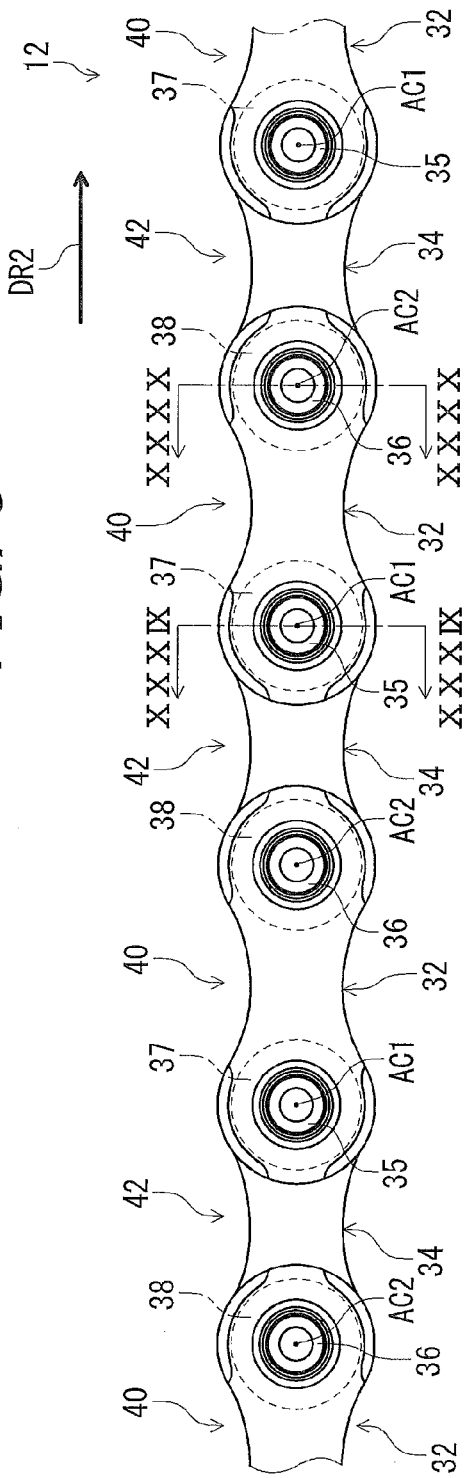

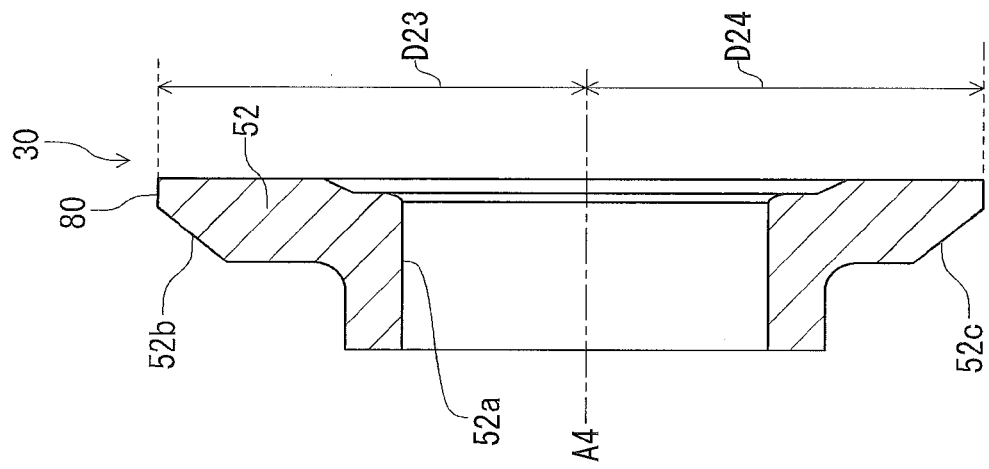
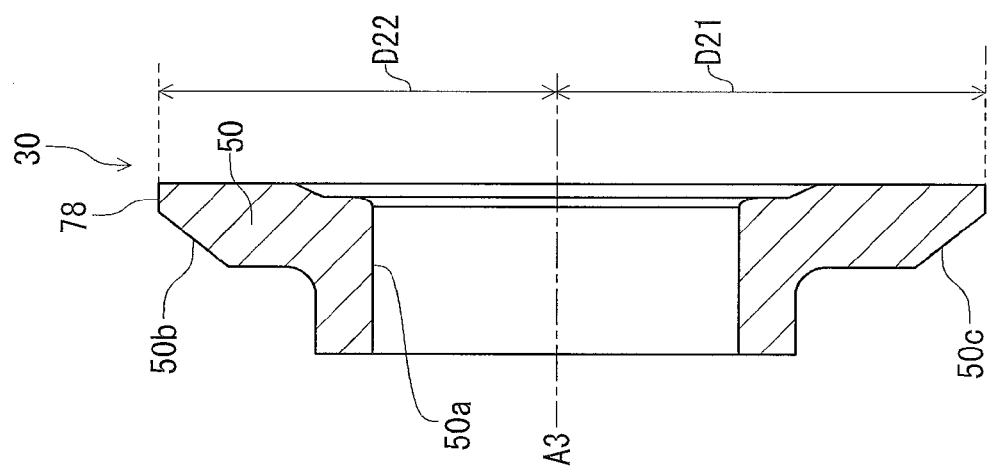

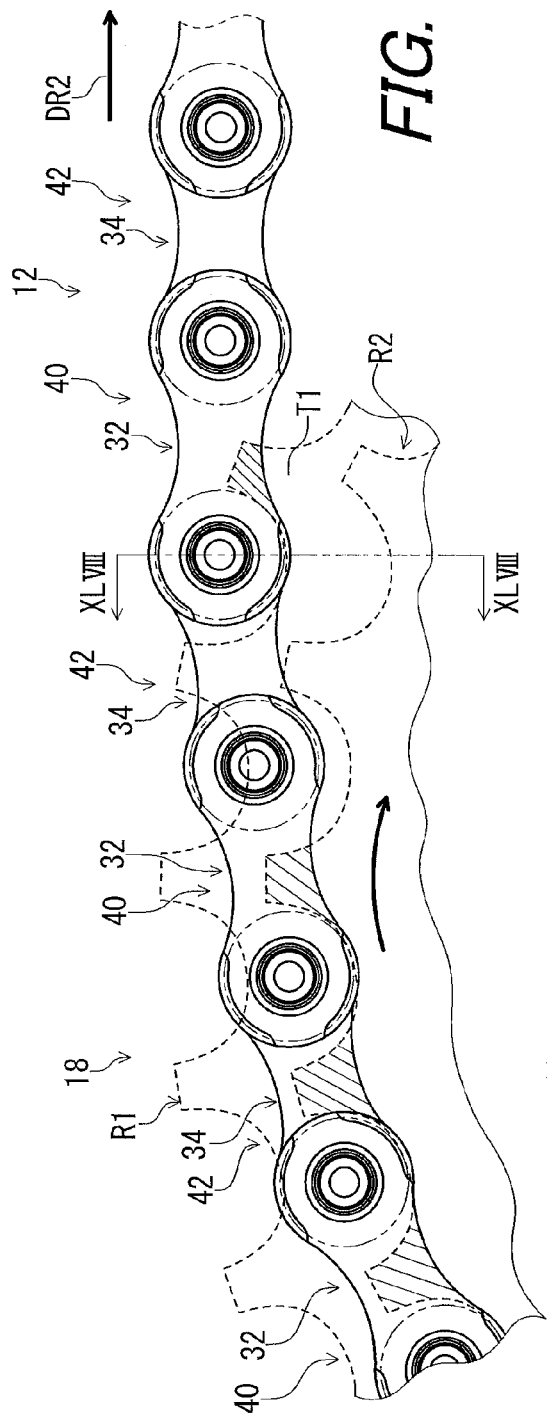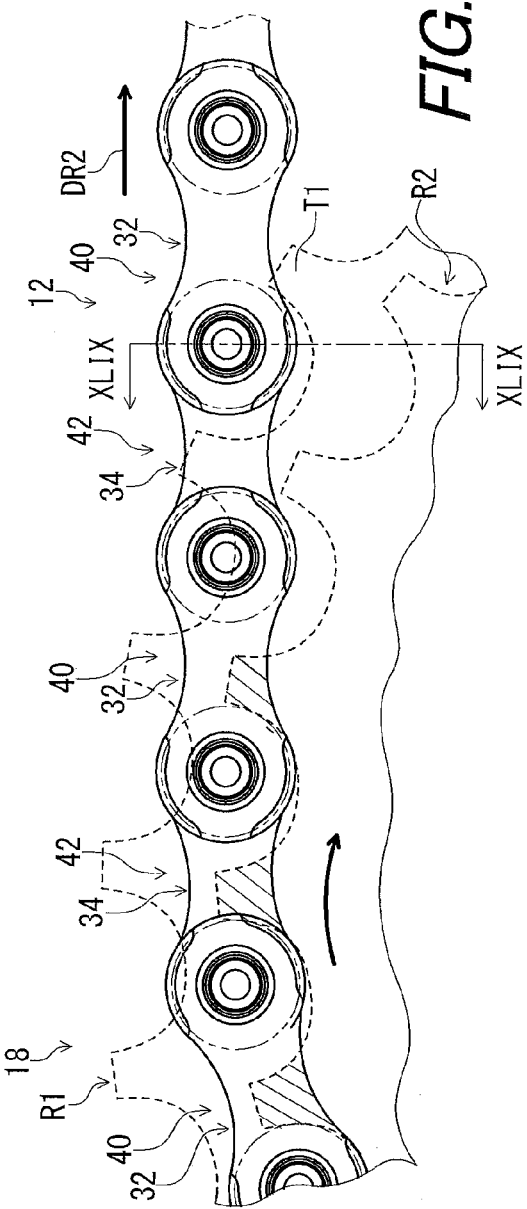

BICYCLE CHAIN

BACKGROUND OF THE INVENTION

1. Field of the Invention

The present invention relates to a bicycle chain.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is the bicycle chain.

Most bicycles have a drive train that uses a bicycle chain to transmit the pedaling action from the rider to the rear wheel. The bicycle chain has a plurality of inner links and a plurality of outer links that are interconnected in an alternating manner by a plurality of pins. Typically, each of the inner links includes a pair of inner plates. Each of the outer pin links includes a pair of outer plates.

SUMMARY OF THE INVENTION

In accordance with a first aspect of the present invention, a bicycle chain comprises a first outer link plate, a first inner link plate, and a first link pin. The first outer link plate comprises a first end portion, a second end portion, and a first intermediate portion. The first end portion includes a first opening having a first center axis. The second end portion includes a second opening having a second center axis. The first intermediate portion interconnects the first end portion and the second end portion. The first end portion, the second end portion and the first intermediate portion defines a first outer peripheral edge. The first outer peripheral edge comprises a first end edge, a second end edge, and a pair of first intermediate edges. The first end edge extends about the first end portion. The second end edge extends about the second end portion. The pair of first intermediate edges extends along the first intermediate portion between the first end edge and the second end edge. A first outer-link distance is defined from the first center axis to the first end edge. The first inner link plate comprises a third end portion, a fourth end portion, and a second intermediate portion. The third end portion includes a third opening having a third center axis. The fourth end portion includes a fourth opening having a fourth center axis. The second intermediate portion interconnects the third end portion and the fourth end portion. The third end portion, the fourth end portion and the second intermediate portion defines a second outer peripheral edge. The second outer peripheral edge comprises a third end edge, a fourth end edge, and a pair of second intermediate edges. The third end edge extends about the third end portion. The fourth end edge extends about the fourth end portion. The pair of second intermediate edges extend along the second intermediate portion between the third end edge and the fourth end edge. A first inner-link distance is defined from the third center axis to the third end edge. A second inner-link distance is defined from the third center axis to the third end edge. The first inner-link distance is larger than the second inner-link distance and the first outer-link distance. The first link pin is configured to extend through the first opening and the third opening to rotatably couple the first end portion and the third end portion.

In accordance with a second aspect of the present invention, the bicycle chain according to the first aspect is configured so that the first inner-link distance is defined from the third center axis to the third end edge in a first direction which radially outwardly extends from the third center axis. The second inner-link distance is defined from the third center axis to the third end edge in a second direction which radially outwardly extends from the third center axis. The second direction is different from the first direction.

In accordance with a third aspect of the present invention, the bicycle chain according to the second aspect is configured so that the first outer link plate has a first outer-link longitudinal axis perpendicular to the first center axis and the second center axis. The first inner link plate has a first inner-link longitudinal axis perpendicular to the third center axis and the fourth center axis. The first outer-link distance is defined from the first center axis to the first end edge in the first direction in a state where the first inner-link longitudinal axis is parallel to the first outer-link longitudinal axis.

In accordance with a fourth aspect of the present invention, the bicycle chain according to the second aspect is configured so that the first direction is opposite to the second direction with respect to the third center axis.

In accordance with a fifth aspect of the present invention, the bicycle chain according to the third aspect is configured so that the first direction is perpendicular to the first inner-link longitudinal axis.

In accordance with a sixth aspect of the present invention, the bicycle chain according to the second aspect is configured so that a second outer-link distance is defined from the second center axis to the second end edge. The third inner-link distance is defined from the fourth center axis to the fourth end edge. The fourth inner-link distance is defined from the fourth center axis to the fourth end edge. The third inner-link distance is larger than the fourth inner-link distance and the second outer-link distance.

In accordance with a seventh aspect of the present invention, the bicycle chain according to the sixth aspect is configured so that the third inner-link distance is defined from the fourth center axis to the fourth end edge in a third direction which radially outwardly extends from the fourth center axis. The fourth inner-link distance is defined from the fourth center axis to the fourth end edge in a fourth direction which radially outwardly extends from the fourth center axis. The fourth direction is different from the third direction.

In accordance with an eighth aspect of the present invention, the bicycle chain according to the seventh aspect is configured so that the first outer link plate has a first outer-link longitudinal axis perpendicular to the first center axis and the second center axis. The first inner link plate has a first inner-link longitudinal axis perpendicular to the third center axis and the fourth center axis. The second outer-link distance is defined from the second center axis to the second end edge in the third direction in a state where the first inner-link longitudinal axis is parallel to the first outer-link longitudinal axis.

In accordance with a ninth aspect of the present invention, the bicycle chain according to the seventh aspect is configured so that the third direction is opposite to the fourth direction with respect to the fourth center axis.

In accordance with a tenth aspect of the present invention, the bicycle chain according to the eighth aspect is configured so that the third direction is perpendicular to the first inner-link longitudinal axis.

In accordance with an eleventh aspect of the present invention, the bicycle chain according to the tenth aspect is configured so that the first direction is defined on a first side with respect to the first inner-link longitudinal axis. The third direction is defined on a second side with respect to the first inner-link longitudinal axis. The second side is opposite to the first side with respect to the first inner-link longitudinal axis.

In accordance with a twelfth aspect of the present invention, the bicycle chain according to the eleventh aspect is configured so that the first direction is opposite to the third direction with respect to the first inner-link longitudinal axis.

In accordance with a thirteenth aspect of the present invention, the bicycle chain according to the first aspect further comprises a second outer link plate and a second inner link plate. The second outer link plate comprises a fifth end portion, a sixth end portion, and a third intermediate portion. The fifth end portion includes a fifth opening having a fifth center axis. The sixth end portion includes a sixth opening having a sixth center axis. The third intermediate portion interconnects the fifth end portion and the sixth end portion. The fifth end portion, the six end portion and the third intermediate portion defines a third outer peripheral edge. The third outer peripheral edge comprises a fifth end edge, a sixth end edge, and a pair of third intermediate edges. The fifth end edge extends about the fifth end portion. The sixth end edge extends about the sixth end portion. The pair of third intermediate edges extend along the third intermediate portion between the fifth end edge and the sixth end edge. The second inner link plate comprises a seventh end portion, an eighth end portion, and a fourth intermediate portion. The seventh end portion includes a seventh opening having a seventh center axis. The eighth end portion includes an eighth opening having an eighth center axis. The fourth intermediate portion interconnects the seventh end portion and the eighth end portion. The seventh end portion, the eighth end portion and the fourth intermediate portion defines a fourth outer peripheral edge. The fourth outer peripheral edge comprises a seventh end edge, an eighth end edge, and a pair of fourth intermediate edges. The seventh end edge extends about the seventh end portion. The eighth end edge extends about the eighth end portion. The pair of fourth intermediate edges extend along the fourth intermediate portion between the seventh end edge and the eighth end edge. The first link pin is configured to extend through the fifth opening and the seventh opening to rotatably couple the fifth end portion and the seventh end portion.

In accordance with a fourteenth aspect of the present invention, the bicycle chain according to the thirteenth aspect is configured so that the first outer link plate and the first inner link plate are configured to be positioned closer to a bicycle frame than the second outer link plate and the second inner link plate respectively in a state where the bicycle chain engages with a bicycle rear sprocket.

In accordance with a fifteenth aspect of the present invention, the bicycle chain according to the fourteenth aspect is configured so that the third end portion of the first inner link plate is positioned downstream of the fourth end portion of the first inner link plate with respect to a chain driving direction in a state where the bicycle chain engages with the bicycle rear sprocket.

In accordance with a sixteenth aspect of the present invention, the bicycle chain according to the fourteenth aspect is configured so that the first inner-link distance is defined from the third center axis to the third end edge in a first direction which radially outwardly extends from the third center axis. The second inner-link distance is defined from the third center axis to the third end edge in a second direction which radially outwardly extends from the third center axis. The second direction is different from the first direction.

In accordance with a seventeenth aspect of the present invention, the bicycle chain according to the sixteenth aspect is configured so that the first direction is directed radially inwardly with respect to a rotation axis of the bicycle rear sprocket in a state where the bicycle chain engages with the bicycle rear sprocket.

In accordance with an eighteenth aspect of the present invention, the bicycle chain according to the seventeenth aspect is configured so that the third end portion of the first inner link plate is positioned downstream of the fourth end portion of the first inner link plate with respect to a chain driving direction in a state where the bicycle chain engages with the bicycle rear sprocket.

In accordance with a nineteenth aspect of the present invention, the bicycle chain according to the sixteenth aspect is configured so that the first outer link plate has a first outer-link longitudinal axis perpendicular to the first center axis and the second center axis. The first inner link plate has a first inner-link longitudinal axis perpendicular to the third center axis and the fourth center axis. The first outer-link distance is defined from the first center axis to the first end edge in the first direction in a state where the first inner-link longitudinal axis is parallel to the first outer-link longitudinal axis.

In accordance with a twentieth aspect of the present invention, the bicycle chain according to the nineteenth aspect is configured so that the first direction is perpendicular to the first inner-link longitudinal axis.

In accordance with a twenty-first aspect of the present invention, the bicycle chain according to the thirteenth aspect is configured so that a third outer-link distance is defined from the fifth center axis to the fifth end edge. The fifth inner-link distance is defined from the seventh center axis to the seventh end edge. The fifth inner-link distance is smaller than or equal to the third outer-link distance.

In accordance with a twenty-second aspect of the present invention, the bicycle chain according to the twenty-first aspect is configured so that the first outer link plate and the first inner link plate are configured to be positioned closer to a bicycle frame than the second outer link plate and the second inner link plate respectively in a state where the bicycle chain engages with a bicycle rear sprocket.

In accordance with a twenty-third aspect of the present invention, the bicycle chain according to the thirteenth aspect is configured so that the second inner-link distance is smaller than or equal to the first outer-link distance.

In accordance with a twenty-fourth aspect of the present invention, the bicycle chain according to the first aspect is configured so that the second inner-link distance is smaller than or equal to the first outer-link distance.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a partial plan view of the bicycle chain illustrated in FIG. 1;

FIG. 4 is a partial side elevational view of the bicycle chain illustrated in FIG. 1;

FIG. 21 is a cross sectional view of the first inner link plate taken along line XXI-XXI of the FIG. 20;

FIG. 22 is a cross sectional view of the first inner link plate taken along line XXII-XXII of the FIG. 20;

FIG. 46 is an outside partial elevational view of the bicycle rear sprocket with the bicycle chain being moved laterally off a first rear sprocket of the bicycle rear sprocket, just prior after engagement with a second rear sprocket of the bicycle rear sprocket;

FIG. 47 is an outside partial elevational view of the bicycle rear sprocket with the bicycle chain being completely transferred to the second rear sprocket of the bicycle rear sprocket;

DESCRIPTION OF THE EMBODIMENTS

Figure 1:
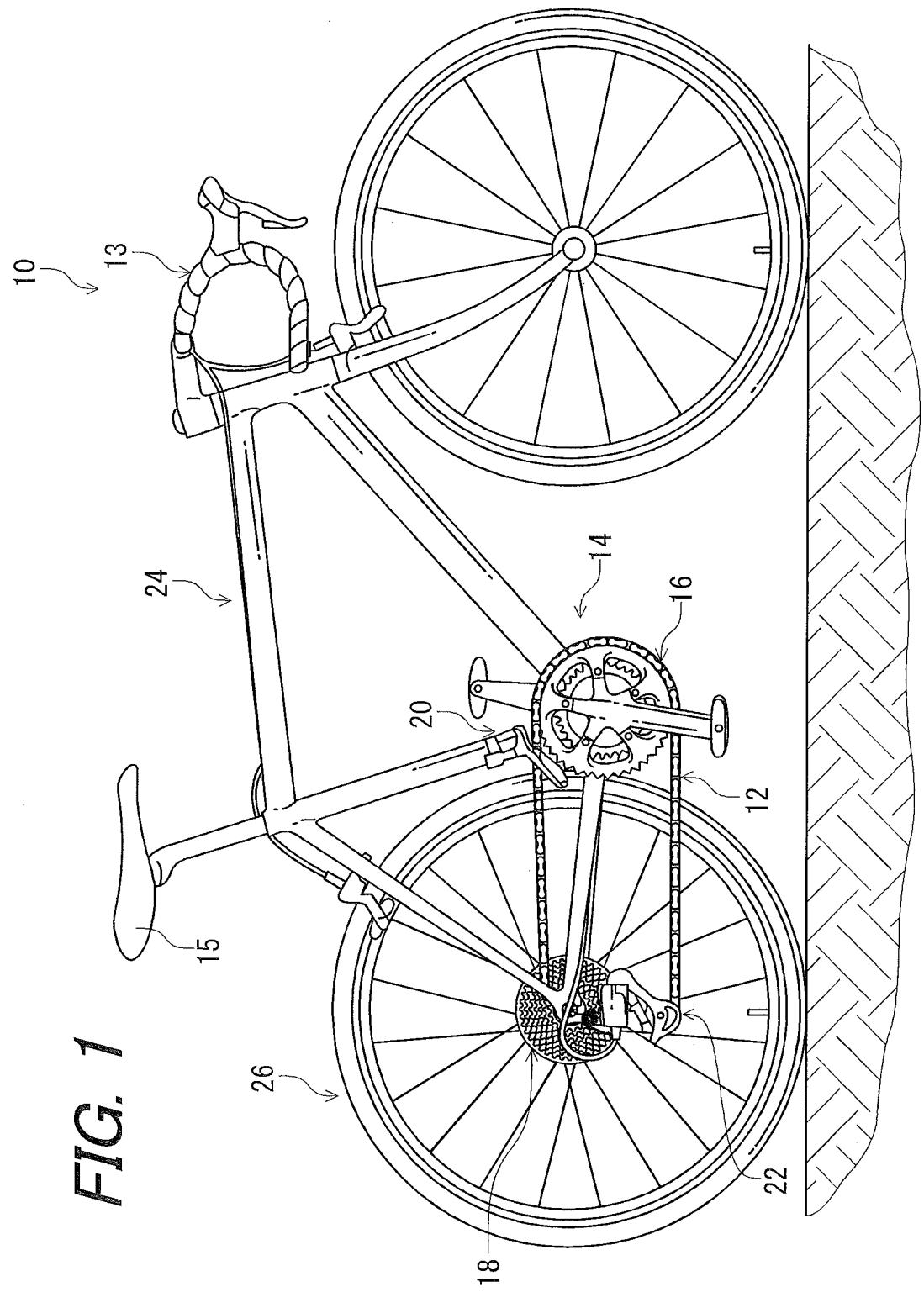
FIG. 1 is a side elevational view of a bicycle having a drive train that uses a bicycle chain in accordance with one embodiment of the present invention.

The embodiments will now be described with reference to the accompanying drawings, wherein like reference numerals designate corresponding or identical elements throughout the various drawings.

Referring initially to FIG. 1, a bicycle 10 is illustrated to be equipped with a bicycle chain 12 in accordance with one embodiment of the present invention. The bicycle 10 includes, among other things, a handlebar 13, a drive train 14, and a saddle 15. The drive train 14 is configured to convert the rider's pedaling force into driving force. The bicycle chain 12 is a part of the drive train 14. The drive train 14 also includes a front crankset 16, a bicycle rear sprocket 18, a front derailleur 20, and a rear derailleur 22. The front crankset 16 is rotatably mounted on a bottom bracket of a bicycle frame 24. The bicycle rear sprocket 18 is mounted to a rear axle of a rear wheel 26. The bicycle chain 12 is arranged on the front crankset 16 and the bicycle rear sprocket 18 so as to extend therebetween. The front derailleur 20 and the rear derailleur 22 are configured and arranged to change gears by shifting the bicycle chain 12 in a transverse direction of the bicycle 10.

In this embodiment, the following directional terms "front", "rear", "forward", "rearward", "left", "right", "transverse", "upward" and "downward" as well as any other similar directional terms refer to those directions which are determined on the basis of the rider who sits on the saddle 15 of the bicycle 10 with facing the handlebar 13, for example. Accordingly, these terms, as utilized to describe the bicycle 10 including the bicycle chain 12 should be interpreted relative to the bicycle 10 as used in an upright riding position on a horizontal surface as illustrated in FIG. 1. These terms, as utilized to describe the bicycle chain 12 should be interpreted relative to the bicycle chain 12 as mounted on the bicycle 10 used in an upright riding position on a horizontal surface as illustrated in FIG. 1.

Figure 2:
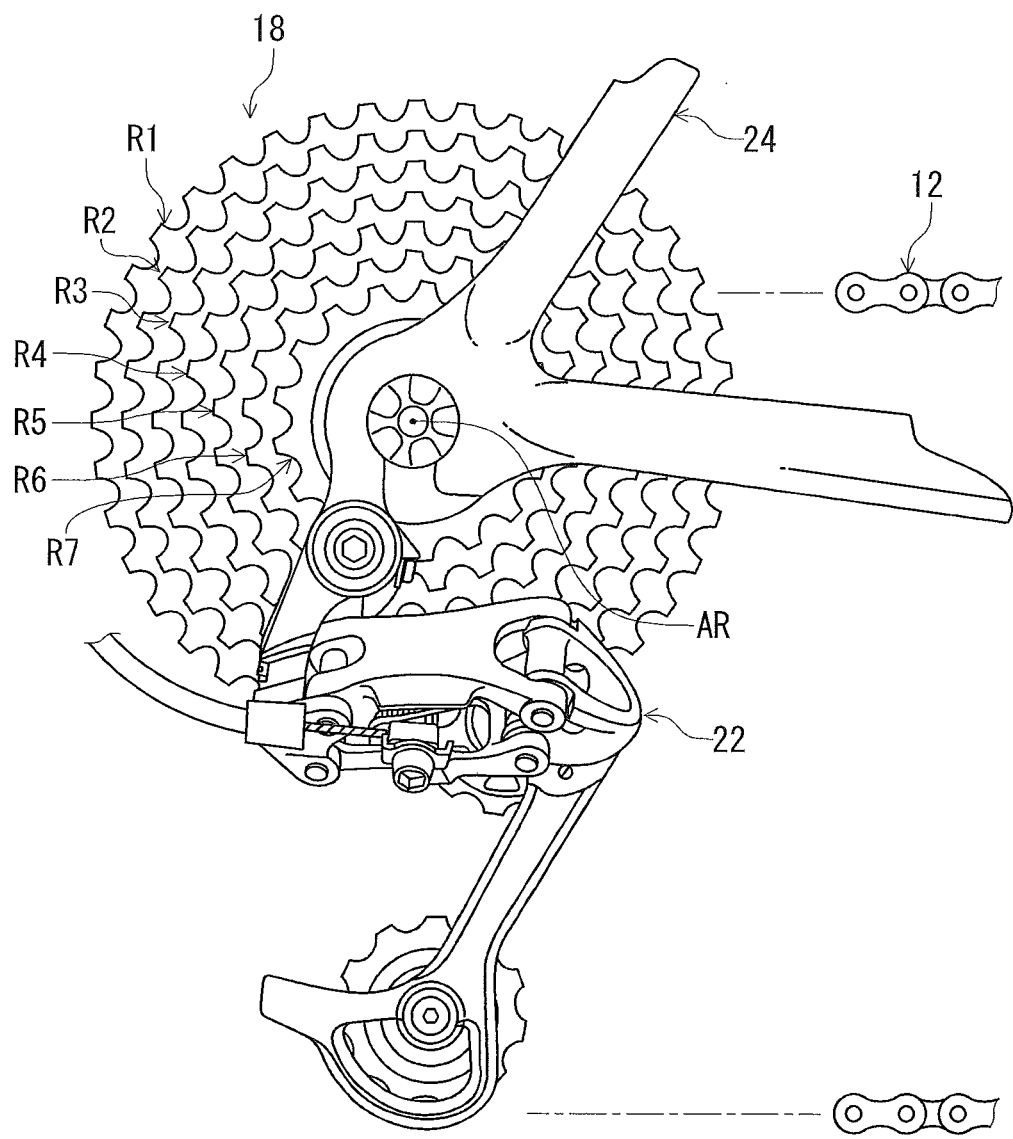
FIG. 2 is an enlarged partial side elevational view of the drive train illustrated in FIG. 1.

Referring now to FIG. 2, the bicycle rear sprocket 18 includes first to seventh rear sprockets R1 to R7 having different numbers of teeth from each other. The first to seventh rear sprockets R1 to R7 are rotatable relative to the bicycle frame 24 about a rotation axis AR. The first to seventh rear sprockets R1 to R7 are lined up in an axial direction parallel to the rotation axis AR. The first to seventh rear sprockets R1 to R7 are arranged in the axial direction with respect to a rotational center axis of the rear sprockets R1 to R7. The first rear sprocket R1 includes the largest number of teeth in the first to seventh rear sprockets R1 to R7. The seventh rear sprocket R7 includes the smallest number of teeth in the first to seventh rear sprockets R1 to R7.

As illustrated in FIG. 2, the rear derailleur 22 is mounted on the bicycle frame 24 and is configured to guide the bicycle chain 12 from one rear sprocket to another adjacent rear sprocket among the first to seventh rear sprockets R1 to R7. Since the rear derailleur 22 includes well known structures, they will not be described in detail herein.

Referring to FIG. 3, the bicycle chain 12 includes first outer link plates 28, first inner link plates 30, second outer link plates 32, second inner link plates 34, first link pins 35, second link pins 36, first rollers 37, and second rollers 38. Each opposed pair of the first outer link plate 28 and the second outer link plate 32 forms an outer link 40. Each opposed pair of the first inner link plate 30 and the second inner link plate 34 forms an inner link 42. The inner links 42 are interconnected in an alternating manner with the outer links 40 by the first link pins 35 and the second link pins 36. A master chain link (not shown) preferably interconnects two pairs of the inner links 42 together so as to form a single continuous loop as depicted in FIG. 1.

As illustrated in FIG. 3, the second outer link plates 32 are spaced apart from the first outer link plates 28 in a transverse direction DR1 of the bicycle 10, respectively. The first inner link plates 30 and the second inner link plates 34 are provided between the first outer link plates 28 and the second outer link plates 32 in the transverse direction DR1. More specifically, the first inner link plate 30 is provided between the first outer link plate 28 and the second outer link plate 32 in the transverse direction DR1. The second inner link plate 34 is provided between the first outer link plate 28 and the second outer link plate 32 in the transverse direction DR1. The first inner link plate 30 is provided between the first outer link plate 28 and the second inner link plate 34 in the transverse direction DR1. The second inner link plate 34 is provided between the first inner link plate 30 and the second outer link plate 32 in the transverse direction DR1. The first outer link plate 28 and the first inner link plate 30 are configured to be positioned closer to the bicycle frame 24 than the second outer link plate 32 and the second inner link plate 34 respectively in a state where the bicycle chain 12 engages with the bicycle rear sprocket 18 (FIGS. 1 and 2).

Referring to FIG. 3, the outer links 40 and the inner links 42 are alternatively arranged in a chain driving direction DR2. The chain driving direction DR2 is defined with respect to the bicycle chain 12 as a direction in which the bicycle chain 12 is driven by the rider's pedaling force to forwardly move the bicycle 10. The bicycle chain 12 can include a mark indicating the chain driving direction DR2. The outer links 40 are rotatably coupled to the inner links 42, respectively. More specifically, the first outer link plate 28 and the second outer link plate 32 are rotatably coupled to the first inner link plate 30 and the second inner link plate 34 about first rotation axes AC1 by the first link pins 35, respectively. The first outer link plate 28 and the second outer link plate 32 are rotatably coupled to the first inner link plate 30 and the second inner link plate 34 about second rotation axes AC2 by the second link pins 36, respectively.

As illustrated in FIG. 3, the first link pins 35 and the second link pins 36 are alternatively arranged in the chain driving direction DR2. The first rotation axes AC1 and the second rotation axes AC2 are alternatively arranged in the chain driving direction DR2. The first rotation axes AC1 and the second rotation axes AC2 are substantially parallel to the transverse direction DR1 in a state where the bicycle chain 12 is mounted on the front crankset 16 and the bicycle rear sprocket 18 (FIGS. 1 and 2).

As illustrated in FIG. 3, the first rollers 37 are provided between the first inner link plates 30 and the second inner link plates 34, respectively. The second rollers 38 are provided between the first inner link plates 30 and the second inner link plates 34, respectively. The first rollers 37 and the second rollers 38 are alternatively arranged in the chain driving direction DR2.

Referring to FIG. 4, each of the first link pins 35 has a cylindrical shape and includes a through-hole extending along the first rotation axis AC1. Each of the second link pins 36 has a cylindrical shape and includes a through-hole extending along the second rotation axis AC2. The first rotation axes AC1 are defined as center axes of the first link pins 35, respectively. The second rotation axes AC2 are defined as center axes of the second link pins 36, respectively. While the first link pins 35 have substantially the same shape as a shape of the second link pins 36, it will be apparent to those skilled in the bicycle field that the first link pins 35 can have a different shape from the shape of the second link pins 36. It will be apparent to those skilled in the bicycle field that the first link pins 35 and the second link pins 36 can have a recess at each end instead of the through-hole.

As illustrated in FIG. 4, each of the first rollers 37 are rotatable relative to the opposed pair of the first inner link plate 30 and the second inner link plate 34 about the first rotation axis AC1. Each of the second rollers 38 are rotatable relative to the opposed pair of the first inner link plate 30 and the second inner link plate 34 about the second rotation axis AC2. While the first rollers 37 have substantially the same shape as a shape of the second rollers 38, it will be apparent to those skilled in the bicycle field that the first rollers 37 can have a different shape from the shape of the second rollers 38.

Figure 5:
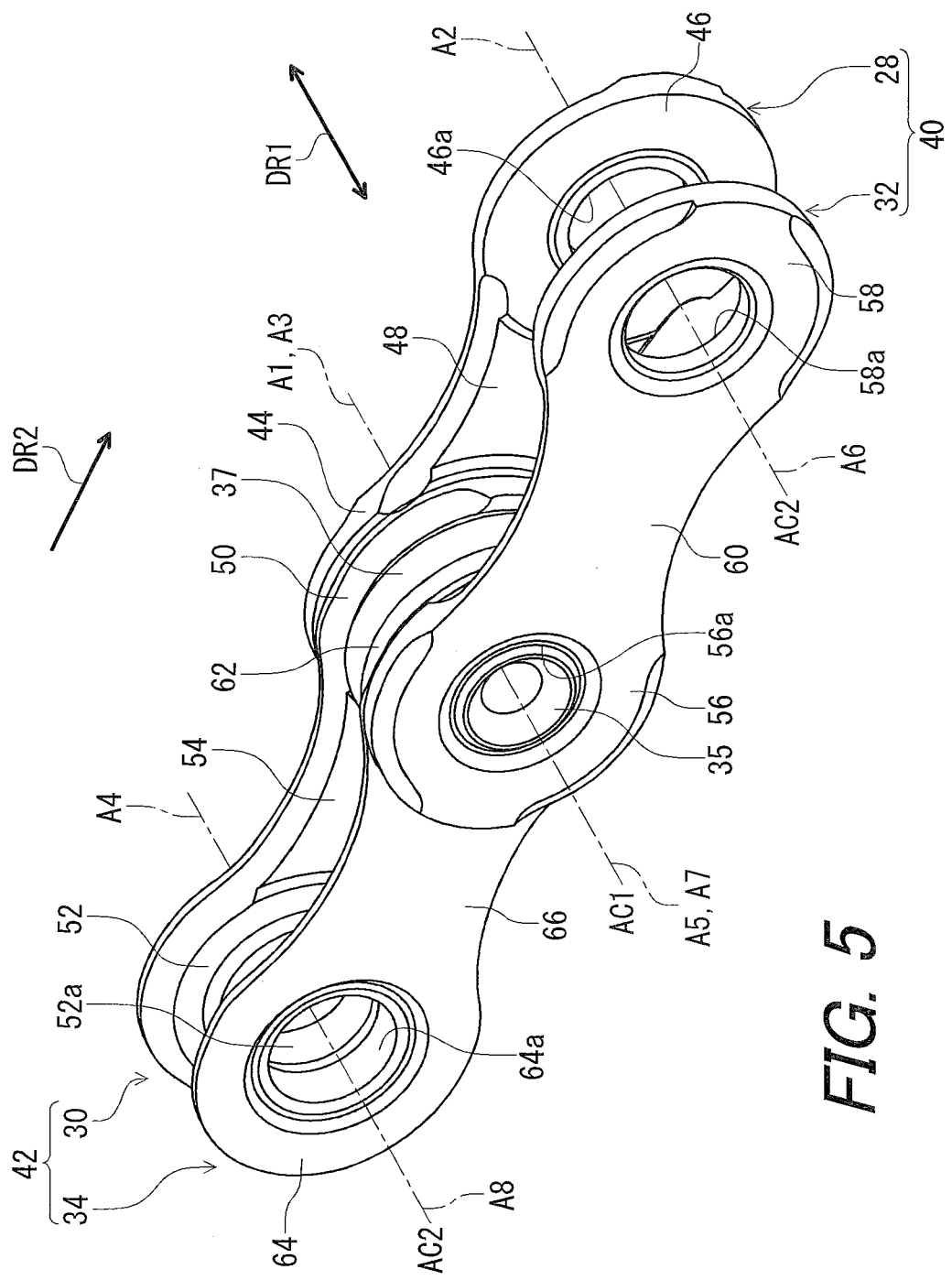
FIG. 5 is an enlarged perspective view of a portion of the bicycle chain illustrated in FIG. 4.
Figure 6:
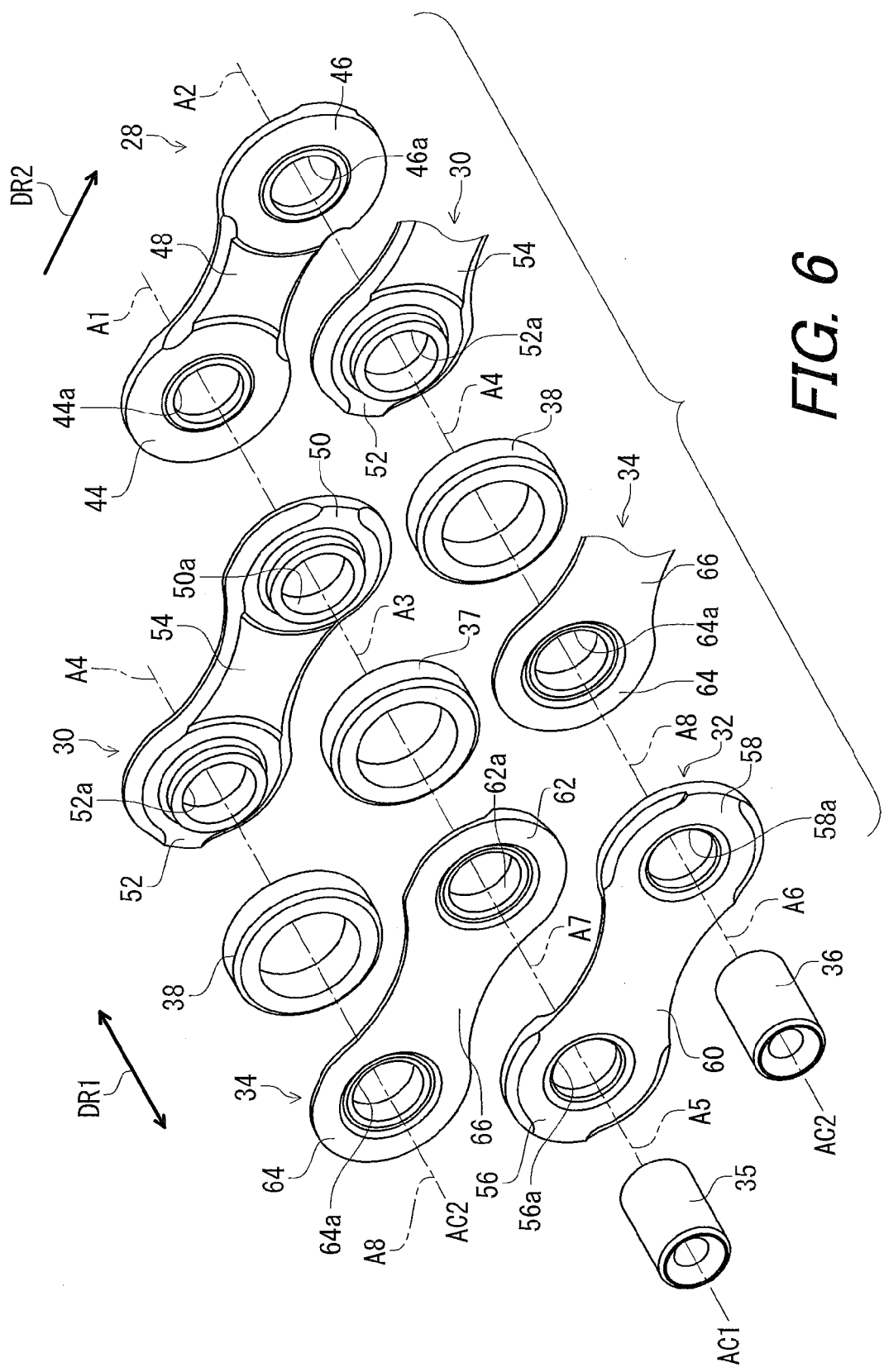
FIG. 6 is an exploded perspective view of a portion of the bicycle chain illustrated in FIG. 5.

Referring to FIGS. 5 and 6, each of the first outer link plates 28 comprises a first end portion 44, a second end portion 46, and a first intermediate portion 48. The first end portion 44 includes a first opening 44a through which one of the first link pins 35 extends. The second end portion 46 includes a second opening 46a through which one of the second link pins 36 extends. The first intermediate portion 48 is provided between the first end portion 44 and the second end portion 46. The first intermediate portion 48 interconnects the first end portion 44 and the second end portion 46. The second end portion 46 is positioned downstream of the first end portion 44 with respect to the chain driving direction DR2 in a state where the bicycle chain 12 engages with the bicycle rear sprocket 18 (FIGS. 1 and 2). The first end portion 44, the second end portion 46, and the first intermediate portion 48 are integrally provided with each other as a one-piece unitary member. The first outer link plate 28 is made of a hard and/or rigid material such as a metallic material.

As illustrated in FIG. 6, the first opening 44a has a first center axis A1, and the second opening 46a has a second center axis A2. The first center axis A1 is substantially parallel to the first rotation axis AC1 and substantially coincides with the first rotation axis AC1. The second center axis A2 is substantially parallel to the second rotation axis AC2 and substantially coincides with the second rotation axis AC2. The first center axis A1 can be defined by the first rotation axis AC1. The second center axis A2 can be defined by the second rotation axis AC2. While the first opening 44a and the second opening 46a are illustrated as two separate and distinct openings, it will be apparent to those skilled in the bicycle field that a single elongated slot can extend between the first opening 44a and the second opening 46a. Thus, the term "opening" should not be limited to a continuous circular hole that extends 360 degrees.

Referring to FIGS. 5 and 6, each of the first inner link plate 30 comprises a third end portion 50, a fourth end portion 52, and a second intermediate portion 54. The third end portion 50 includes a third opening 50a through which one of the first link pins 35 extends (FIG. 6). The fourth end portion 52 includes a fourth opening 52a through which one of the second link pins 36 extends. The second intermediate portion 54 is provided between the third end portion 50 and the fourth end portion 52. The second intermediate portion 54 interconnects the third end portion 50 and the fourth end portion 52. The third end portion 50 of the first inner link plate 30 is positioned downstream of the fourth end portion 52 of the first inner link plate 30 with respect to the chain driving direction DR2 in a state where the bicycle chain 12 engages with the bicycle rear sprocket 18 (FIGS. 1 and 2). The third end portion 50, the fourth end portion 52, and the second intermediate portion 54 are integrally provided with each other as a one-piece unitary member. The first inner link plate 30 is made of a hard and/or rigid material such as a metallic material.

As illustrated in FIG. 6, the third opening 50a has a third center axis A3, and the fourth opening 52a has a fourth center axis A4. The third center axis A3 is substantially parallel to the first rotation axis AC1 and substantially coincides with the first rotation axis AC1. The fourth center axis A4 is substantially parallel to the second rotation axis AC2 and substantially coincides with the second rotation axis AC2. The third center axis A3 can be defined by the first rotation axis AC1. The fourth center axis A4 can be defined by the second rotation axis AC2. While the third opening 50a and the fourth opening 52a are illustrated as two separate and distinct openings, it will be apparent to those skilled in the bicycle field that a single elongated slot can extend between the third opening 50a and the fourth opening 52a. Thus, the term "opening" should not be limited to a continuous circular hole that extends 360 degrees.

Referring to FIGS. 5 and 6, each of the second outer link plates 32 comprises a fifth end portion 56, a sixth end portion 58, and a third intermediate portion 60. The fifth end portion 56 includes a fifth opening 56a through which one of the first link pins 35 extends. The sixth end portion 58 includes a sixth opening 58a through which one of the second link pins 36 extends. The third intermediate portion 60 is provided between the fifth end portion 56 and the sixth end portion 58. The third intermediate portion 60 interconnects the fifth end portion 56 and the sixth end portion 58. The sixth end portion 58 is positioned downstream of the fifth end portion 56 with respect to the chain driving direction DR2 in a state where the bicycle chain 12 engages with the bicycle rear sprocket 18 (FIGS. 1 and 2). The fifth end portion 56, the sixth end portion 58, and the third intermediate portion 60 are integrally provided with each other as a one-piece unitary member. The second outer link plate 32 is made of a hard and/or rigid material such as a metallic material.

As illustrated in FIG. 6, the fifth opening 56a has a fifth center axis A5, and the sixth opening 58a has a sixth center axis A6. The fifth center axis A5 is substantially parallel to the first rotation axis AC1 and substantially coincides with the first rotation axis AC1. The sixth center axis A6 is substantially parallel to the second rotation axis AC2 and substantially coincides with the second rotation axis AC2. The fifth center axis A5 can be defined by the first rotation axis AC1. The sixth center axis A6 can be defined by the second rotation axis AC2. While the fifth opening 56a and the sixth opening 58a are illustrated as two separate and distinct openings, it will be apparent to those skilled in the bicycle field that a single elongated slot can extend between the fifth opening 56a and the sixth opening 58a. Thus, the term "opening" should not be limited to a continuous circular hole that extends 360 degrees.

Referring to FIGS. 5 and 6, each of the second inner link plate 34 comprises a seventh end portion 62, an eighth end portion 64, and a fourth intermediate portion 66. The seventh end portion 62 includes a seventh opening 62a through which one of the first link pins 35 extends. The eighth end portion 64 includes an eighth opening 64a through which one of the second link pins 36 extends. The fourth intermediate portion 66 is provided between the seventh end portion 62 and the eighth end portion 64. The fourth intermediate portion 66 interconnects the seventh end portion 62 and the eighth end portion 64. The seventh end portion 62 is positioned downstream of the eighth end portion 64 with respect to the chain driving direction DR2 in a state where the bicycle chain 12 engages with the bicycle rear sprocket 18. The seventh end portion 62, the eighth end portion 64, and the fourth intermediate portion 66 are integrally provided with each other as a one-piece unitary member. The second inner link plate 34 is made of a hard and/or rigid material such as a metallic material.

As illustrated in FIG. 6, the seventh opening 62a has a seventh center axis A7, and the eighth opening 64a has an eighth center axis A8. The seventh center axis A7 is substantially parallel to the first rotation axis AC1 and substantially coincides with the first rotation axis AC1. The eighth center axis A8 is substantially parallel to the second rotation axis AC2 and substantially coincides with the second rotation axis AC2. The seventh center axis A7 can be defined by the first rotation axis AC1. The eighth center axis A8 can be defined by the second rotation axis AC2. While the seventh opening 62a and the eighth opening 64a are illustrated as two separate and distinct openings, it will be apparent to those skilled in the bicycle field that a single elongated slot can extend between the seventh opening 62a and the eighth opening 64a. Thus, the term "opening" should not be limited to a continuous circular hole that extends 360 degrees.

As illustrated in FIG. 6, each of the first link pins 35 is configured to extend through the first opening 44a and the third opening 50a to rotatably couple the first end portion 44 and the third end portion 50 about the first rotation axis AC1. Each of the first link pins 35 is configured extend through the fifth opening 56a and the seventh opening 62a to rotatably couple the fifth end portion 56 and the seventh end portion 62 about the first rotation axis AC 1. In the illustrated embodiment, an inner diameter of the first opening 44a is smaller than an outer diameter of the first link pin 35, and thereby the first link pins 35 are press-fitted in the first openings 44a, respectively. An inner diameter of the third opening 50a is greater than the outer diameter of the first link pin 35. The first link pin 35 extends through the third opening 50a to allow the first inner link plate 30 to rotate relative to the first link pin 35 and the first outer link plate 28. In the illustrated embodiment, an inner diameter of the fifth opening 56a is smaller than the outer diameter of the first link pin 35, and thereby the first link pins 35 are press-fitted in the fifth openings 56a, respectively. An inner diameter of the seventh opening 62a is greater than the outer diameter of the first link pin 35. The first link pin 35 extends through the seventh opening 62a to allow the second inner link plate 34 to rotate relative to the first link pin 35 and the second outer link plate 32.

As illustrated in FIG. 6, each of the second link pins 36 is configured to extend through the second opening 46a and the fourth opening 52a to rotatably couple the second end portion 46 and the fourth end portion 52 about the second rotation axis AC2. Each of the second link pins 36 is configured extend through the sixth opening 58a and the eighth opening 64a to rotatably couple the sixth end portion 58 and the eighth end portion 64 about the second rotation axis AC2. In the illustrated embodiment, an inner diameter of the second opening 46a is smaller than an outer diameter of the second link pin 36, and thereby the second link pins 36 are press-fitted in the second openings 46a, respectively. An inner diameter of the fourth opening 52a is greater than the outer diameter of the second link pin 36. The second link pin 36 extends through the fourth opening 52a to allow the first inner link plate 30 to rotate relative to the second link pin 36 and the first outer link plate 28. In the illustrated embodiment, an inner diameter of the sixth opening 58a is smaller than the outer diameter of the second link pin 36, and thereby the second link pins 36 are press-fitted in the sixth openings 58a, respectively. An inner diameter of the eighth opening 64a is greater than the outer diameter of the second link pin 36. The second link pin 36 extends through the eighth opening 64a to allow the second inner link plate 34 to rotate relative to the second link pin 36 and the second outer link plate 32. Since the first link pins 35 and the second link pins 36 include well know structures, they will not be described in detail herein.

As illustrated in FIG. 6, each of the first rollers 37 is provided between the first inner link plate 30 and the second inner link plate 34 and rotatably supported by the first inner link plate 30 and the second inner link plate 34. Each of the first rollers 37 has an annular shape and is configured to engage with the teeth of the bicycle rear sprocket 18. Each of the second rollers 38 is provided between the first inner link plate 30 and the second inner link plate 34 and rotatably supported by the first inner link plate 30 and the second inner link plate 34. Each of the second rollers 38 has an annular shape and is configured to engage with the teeth of the bicycle rear sprocket 18. Since the first rollers 37 and the second rollers 38 include well know structures, they will not be described in detail herein.

Figure 7:
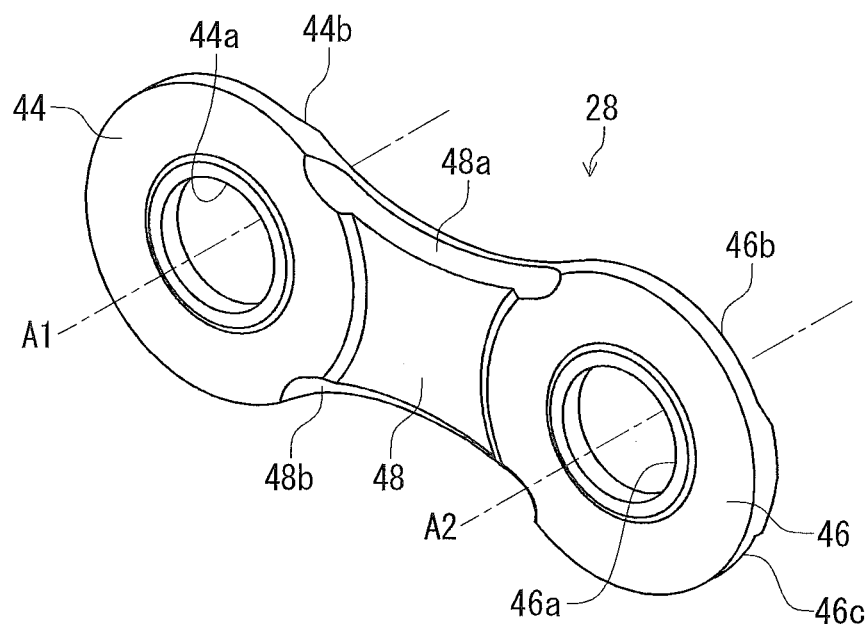
FIG. 7 is an outside perspective view of a first outer link plate illustrated in FIG. 6.
Figure 8:
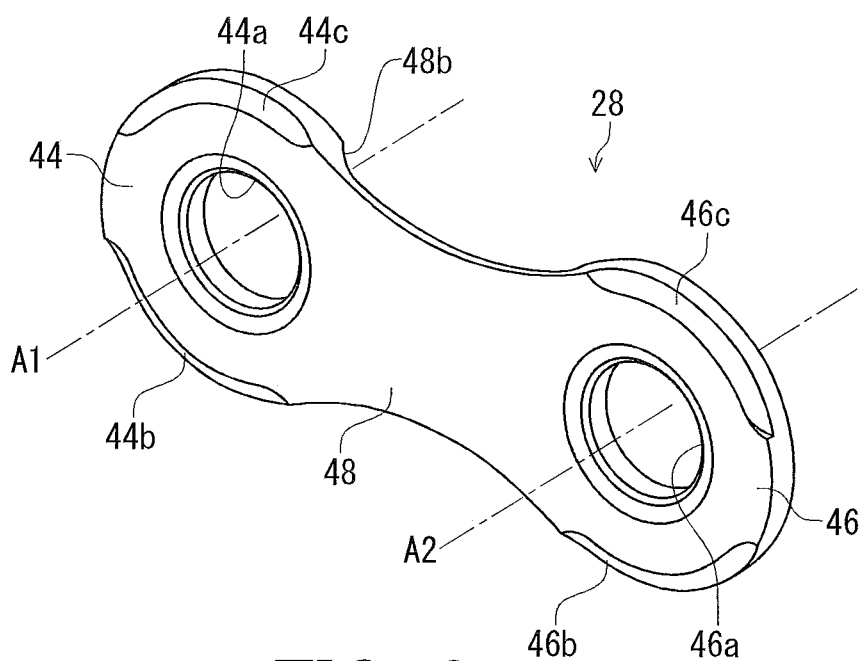
FIG. 8 is an inside perspective view of the first outer link plate illustrated in FIG. 7.

Referring to FIGS. 7 and 8, the first end portion 44 of the first outer link plate 28 includes first chamfers 44b and 44c. The first chamfers 44b and 44c have a substantially arc shape extending about the first opening 44a. The second end portion 46 includes second chamfers 46b and 46c. The second chamfers 46b and 46c have a substantially arc shape extending about the second opening 46a. The first intermediate portion 48 includes first intermediate chamfers 48a and 48b. The first intermediate chamfers 48a and 48b have a substantially arc shape and extend along the first intermediate portion 48 from the first end portion 44 to the second end portion 46.

Figure 9:
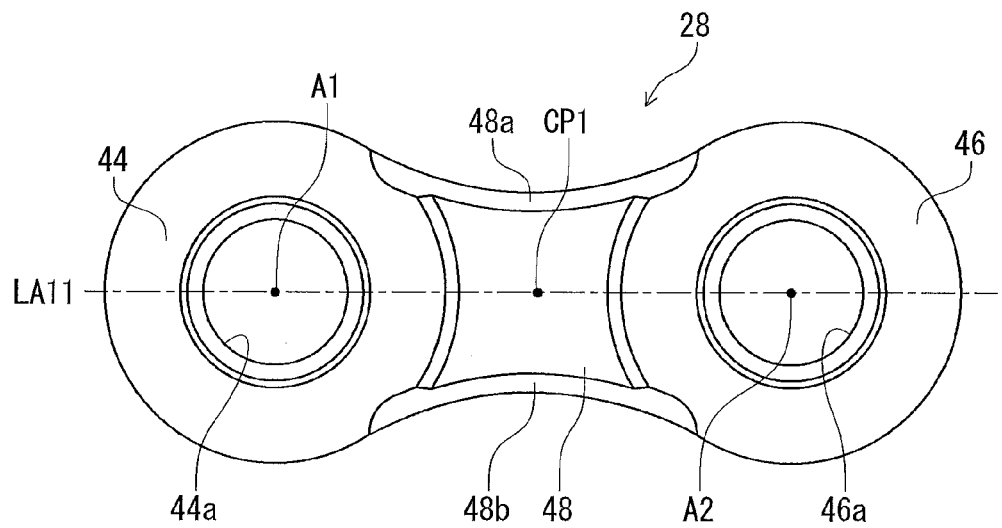
FIG. 9 is an outside elevational view of the first outer link plate illustrated in FIG. 7.
Figure 10:
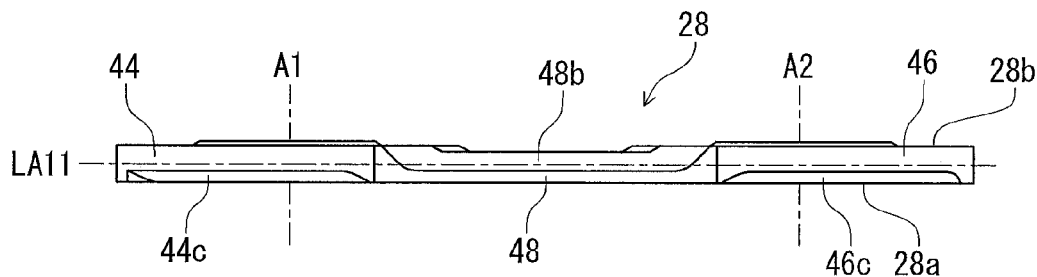
FIG. 10 is a bottom view of the first outer link plate illustrated in FIG. 7.
Figure 11:
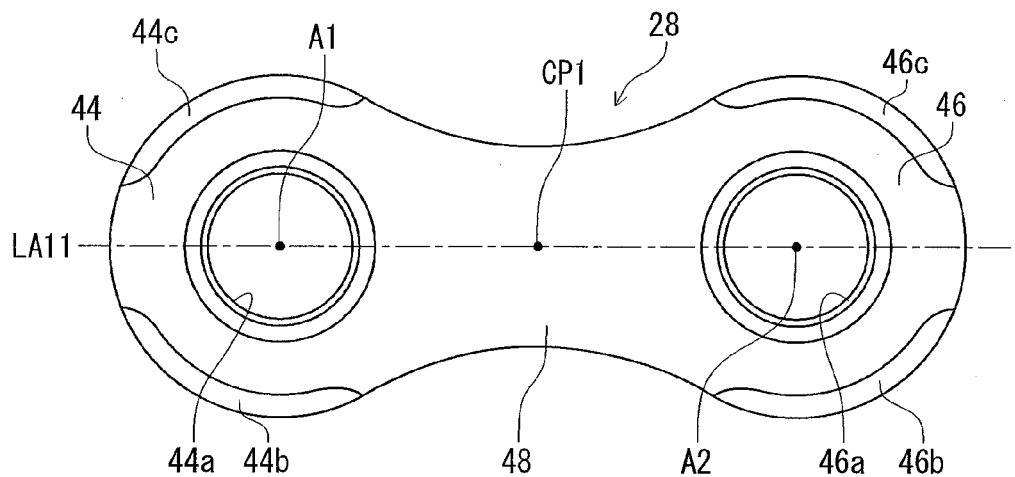
FIG. 11 is an inside elevational view of the first outer link plate illustrated in FIG. 7.

Referring to FIGS. 9 to 11, the first outer link plate 28 has a first outer-link longitudinal axis LA11 perpendicular to the first center axis A1 and the second center axis A2. The first outer-link longitudinal axis LA11 is defined at a center of the first outer link plate 28 in a direction defined along the first center axis A1 and the second center axis A2. The first outer link plate 28 extends along the first outer-link longitudinal axis LA11. The first outer link plate 28 is symmetrical with respect to the first outer-link longitudinal axis LA11 when viewed from a direction parallel to the first center axis A1 and the second center axis A2. It will be apparent to those skilled in the bicycle field that the first outer link plate 28 can be asymmetrical with respect to the first outer-link longitudinal axis LA11.

As illustrated in FIG. 10, the first outer link plate 28 includes a first interiorly facing surface 28a and a first exteriorly facing surface 28b. The first interiorly facing surface 28a is positioned closer to the bicycle frame 24 than the first exteriorly facing surface 28b in a state where the bicycle chain 12 is engaged with the bicycle rear sprocket 18.

As illustrated in FIGS. 9 to 11, the first chamfers 44b and 44c are provided on the first interiorly facing surface 28a. The second chamfers 46b and 46c are provided on the first interiorly facing surface 28a. The first intermediate chamfers 48a and 48b are provided on the first exteriorly facing surface 28b.

As illustrated in FIGS. 9 and 11, a first center point CP1 is defined on the first outer-link longitudinal axis LA11 of the first outer link plate 28. The first center point CP1 is provided at a center position between the first center axis A1 and the second center axis A2. The first outer link plate 28 is symmetrical with respect to the first center point CP1 when viewed from the direction parallel to the first center axis A1 and the second center axis A2. It will be apparent to those skilled in the bicycle field that the first outer link plate 28 can be asymmetrical with respect to the first center point CP1.

Figure 12:
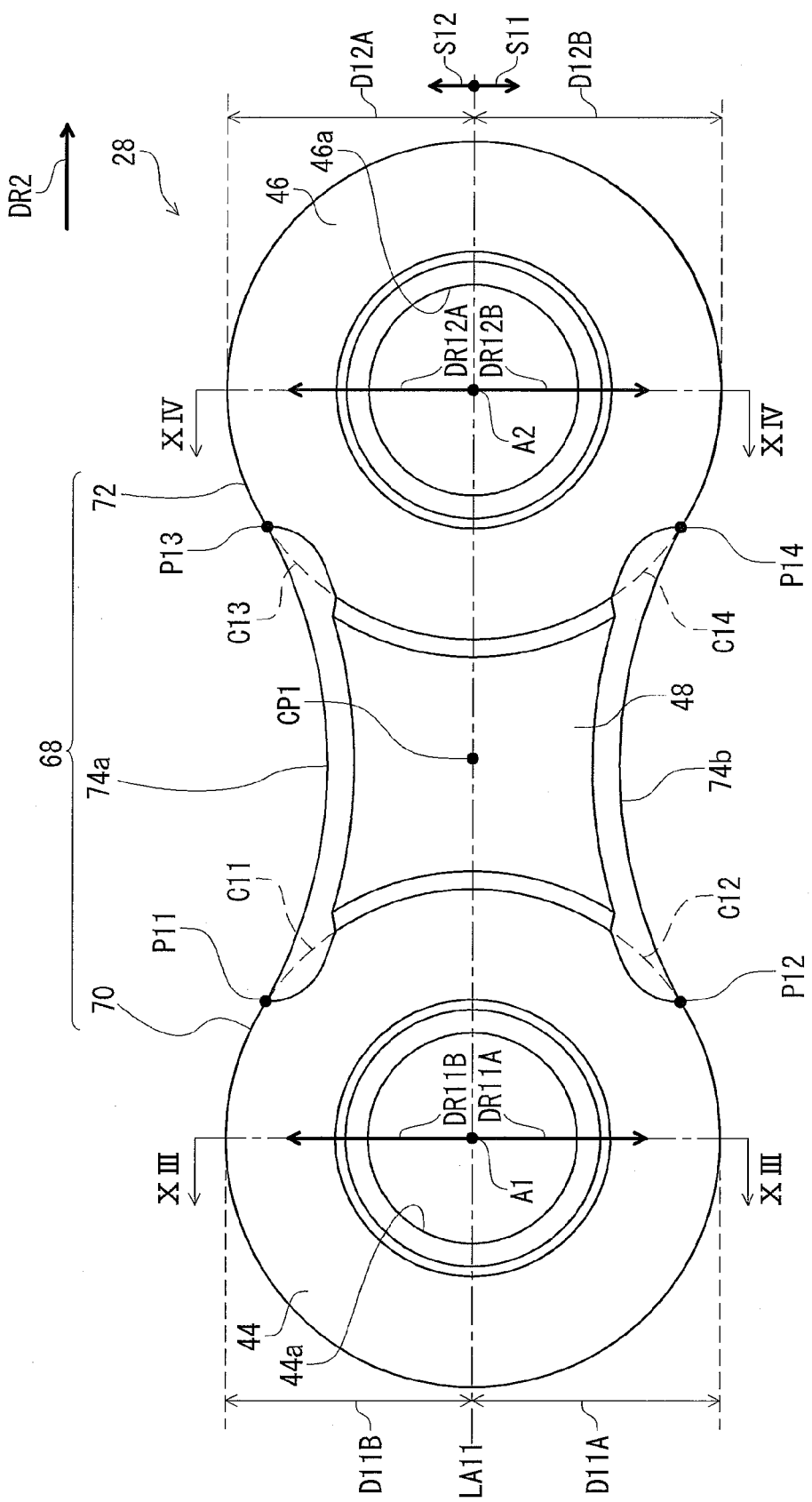
FIG. 12 is an outside elevational view of the first outer link plate illustrated in FIG. 7.

Referring to FIG. 12, the first end portion 44, the second end portion 46, and the first intermediate portion 48 define a first outer peripheral edge 68. In the illustrated embodiment, the first outer peripheral edge 68 is an outer peripheral surface of the first outer link plate 28. The first outer peripheral edge 68 is an outline of the first outer link plate 28 when viewed from a direction parallel to the first center axis A1 and the second center axis A2. The first outer peripheral edge 68 comprises a first end edge 70, a second end edge 72, and a pair of first intermediate edges 74a and 74b. The first end edge 70 extends about the first end portion 44. The second end edge 72 extends about the second end portion 46. The pair of first intermediate edges 74a and 74b extend along the first intermediate portion 48 between the first end edge 70 and the second end edge 72. The first intermediate edge 74a is provided on an opposite side of the first intermediate edge 74b with respect to the first outer-link longitudinal axis LA11.

As illustrated in FIG. 12, the first end edge 70 is defined between a first point P11 and a second point P12. The first point P11 is defined on a first virtual semicircle C11 having a center disposed on the first center axis A1. The first virtual semicircle C11 is defined on a second side S12 with respect to the first outer-link longitudinal axis LA11. The first virtual semicircle C11 is defined to substantially coincide with an outermost outline of the first end portion 44 having a maximum outer diameter on the second side S12 when viewed from a direction parallel to the first center axis A1 and the second center axis A2. The first point P11 is a point at which the first virtual semicircle C11 joins the outline of the first outer link plate 28 (the outermost outline of the first end portion 44) from the first intermediate portion 48. The second point P12 is defined on a second virtual semicircle C12 having a center disposed on the first center axis A1. The second virtual semicircle C12 is defined on a first side S11 with respect to the first outer-link longitudinal axis LA11. The second side S12 is opposite to the first side S11 with respect to the first outer-link longitudinal axis LA11. The second virtual semicircle C12 is defined to substantially coincide with the outermost outline of the first end portion 44 having a maximum outer diameter on the first side S11 when viewed from the direction parallel to the first center axis A1 and the second center axis A2. The second point P12 is a point at which the second virtual semicircle C12 joins the outline of the first outer link plate 28 (the outermost outline of the first end portion 44) from the first intermediate portion 48.

As illustrated in FIG. 12, the second end edge 72 is provided between a third point P13 and a fourth point P14. The third point P13 is defined on a third virtual semicircle C13 having a center disposed on the second center axis A2. The third virtual semicircle C13 is defined on the second side S12 with respect to the first outer-link longitudinal axis LA11. The third virtual semicircle C13 is defined to substantially coincide with an outermost outline of the second end portion 46 having a maximum outer diameter on the second side S12 when viewed from the direction parallel to the first center axis A1 and the second center axis A2. The third point P13 is a point at which the third virtual semicircle C13 joins the outline of the first outer link plate 28 (the outermost outline of the second end portion 46) from the first intermediate portion 48. The fourth point P14 is defined on a fourth virtual semicircle C14 having a center disposed on the second center axis A2. The fourth virtual semicircle C14 is defined on the first side S11 with respect to the first outer-link longitudinal axis LA11. The fourth virtual semicircle C14 is defined to substantially coincide with the outermost outline of the second end portion 46 having a maximum outer diameter on the first side S11 when viewed from the direction parallel to the first center axis A1 and the second center axis A2. The fourth point P14 is a point at which the fourth virtual semicircle C14 joins the outline of the first outer link plate 28 (the outermost outline of the second end portion 46) from the first intermediate portion 48.

Figure 14:
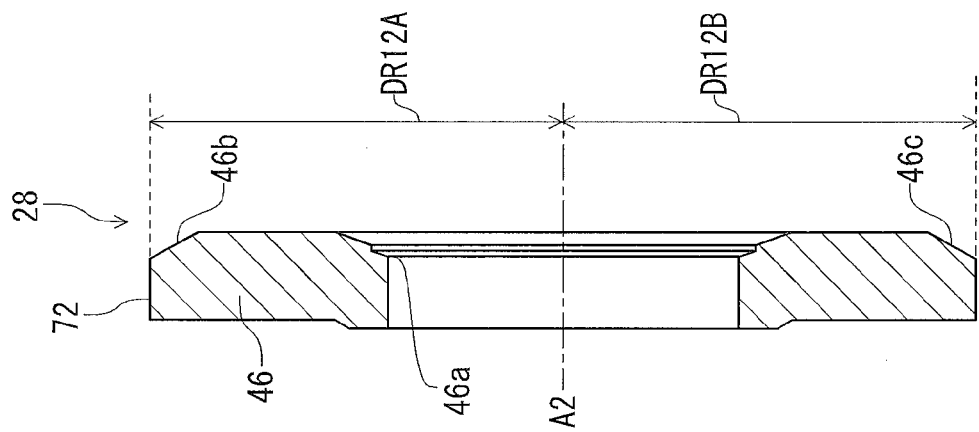
FIG. 14 is a cross sectional view of the first outer link plate taken along line XIV-XIV of the FIG. 12.
Figure 13:
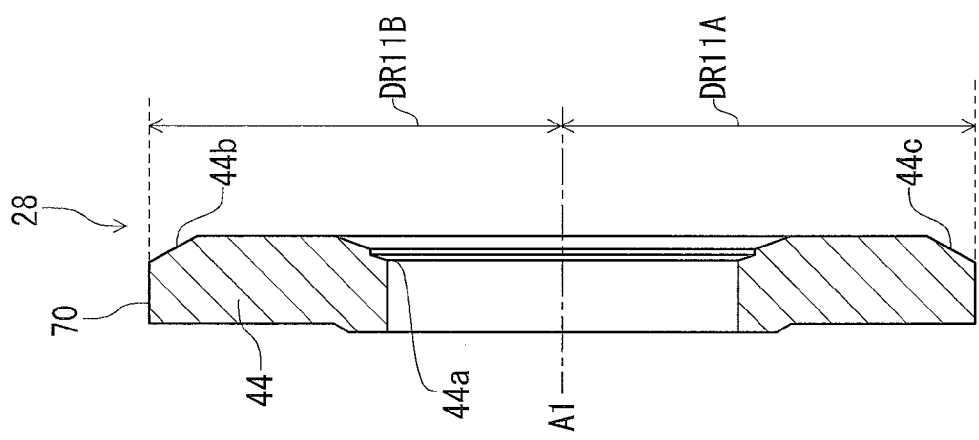
FIG. 13 is a cross sectional view of the first outer link plate taken along line XIII-XIII of the FIG. 12.

As illustrated in FIGS. 12 to 14, first outer-link distances D11A and D11B are defined from the first center axis A1 to the first end edge 70. More specifically, the first outer-link distance D11A is defined from the first center axis A1 to the first end edge 70 in a direction DR11A. The first outer-link distance D11B is defined from the first center axis A1 to the first end edge 70 in a direction DR11B. The directions DR11A and DR11B radially outwardly protrude from the first center axis A1 and are perpendicular to the first center axis A1. In the illustrated embodiment, the directions DR11A and DR11B are perpendicular to the first outer-link longitudinal axis LA11. The direction DR11A is opposite to the direction DR11B with respect to the first center axis A1. The direction DR11A is defined on the first side S11 with respect to the first outer-link longitudinal axis LA11. The direction DR11B is defined on the second side S12 with respect to the first outer-link longitudinal axis LA11. The direction DR11A is directed radially inwardly with respect to the rotation axis AR of the bicycle rear sprocket 18 in a state where the bicycle chain 12 engages with the bicycle rear sprocket 18. The direction DR11B is directed radially outwardly with respect to the rotation axis AR of the bicycle rear sprocket 18 in a state where the bicycle chain 12 engages with the bicycle rear sprocket 18. In the illustrated embodiment, the first outer-link distance D11A is equal to the first outer-link distance D11B.

Second outer-link distances D12A and D12B are defined from the second center axis A2 to the second end edge 72. More specifically, the second outer-link distance D12A is defined from the second center axis A2 to the second end edge 72 in a direction DR12A. The second outer-link distance D12B is defined from the second center axis A2 to the second end edge 72 in a direction DR12B. The directions DR12A and DR12B radially outwardly protrude from the second center axis A2 and are perpendicular to the second center axis A2. In the illustrated embodiment, the directions DR12A and DR12B are perpendicular to the first outer-link longitudinal axis LA11. The direction DR12A is opposite to the direction DR12B with respect to the second center axis A2. The direction DR12A is defined on the second side S12 with respect to the first outer-link longitudinal axis LA11. The direction DR12B is defined on the first side S11 with respect to the first outer-link longitudinal axis LA11. The direction DR12A is directed radially outwardly with respect to the rotation axis AR of the bicycle rear sprocket 18 in a state where the bicycle chain 12 engages with the bicycle rear sprocket 18. The direction DR12B is directed radially inwardly with respect to the rotation axis AR of the bicycle rear sprocket 18 in a state where the bicycle chain 12 engages with the bicycle rear sprocket 18. In the illustrated embodiment, the second outer-link distance D12A is equal to the second outer-link distance D12B.

Figure 15:
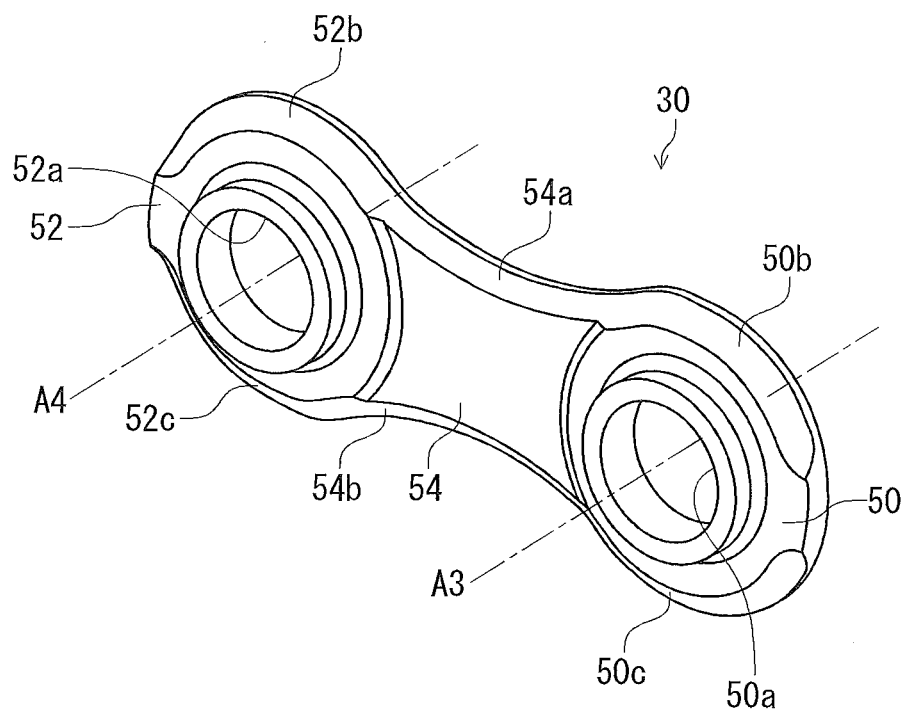
FIG. 15 is an outside perspective view of a first inner link plate illustrated in FIG. 6.
Figure 16:
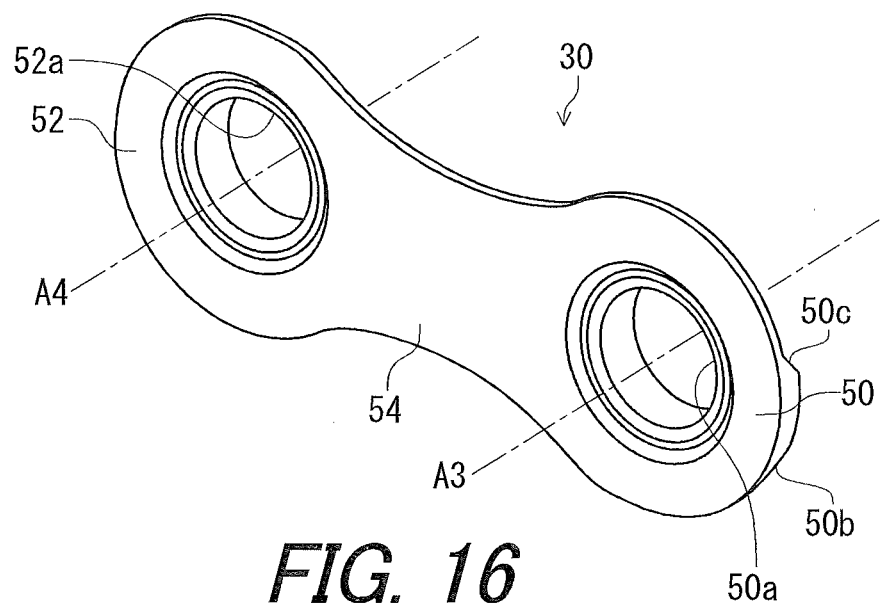
FIG. 16 is an inside perspective view of the first inner link plate illustrated in FIG. 15.

Referring to FIGS. 15 and 16, the third end portion 50 of the first inner link plate 30 includes third chamfers 50b and 50c. The third chamfers 50b and 50c have a substantially arc shape extending about the third opening 50a. The fourth end portion 52 includes fourth chamfers 52b and 52c. The fourth chamfers 52b and 52c have a substantially arc shape extending about the fourth opening 52a. The second intermediate portion 54 includes second intermediate chamfers 54a and 54b. The second intermediate chamfers 54a and 54b have a substantially arc shape and extend along the second intermediate portion 54 from the third end portion 50 to the fourth end portion 52.

Figure 17:
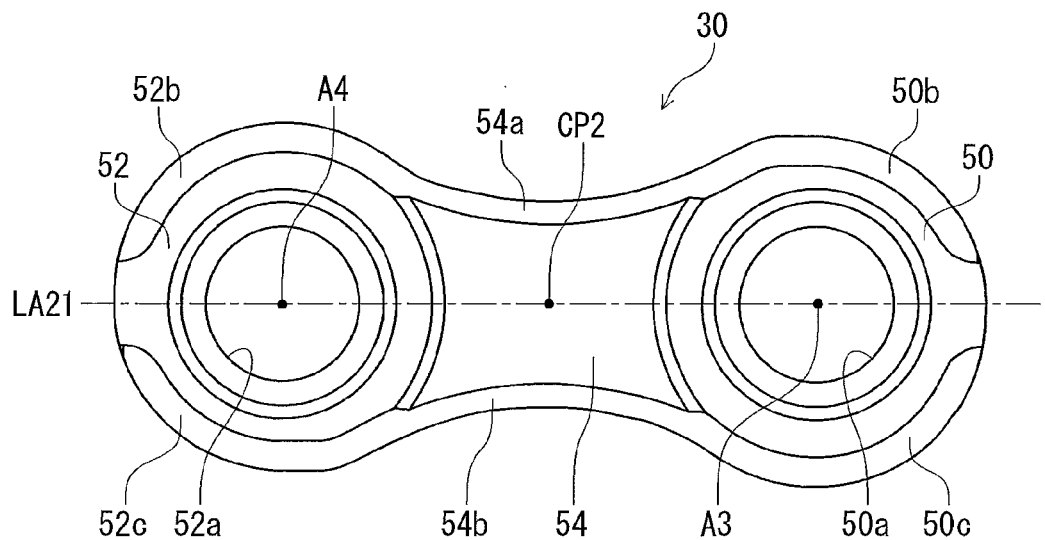
FIG. 17 is an outside elevational view of the first inner link plate illustrated in FIG. 15.
Figure 18:
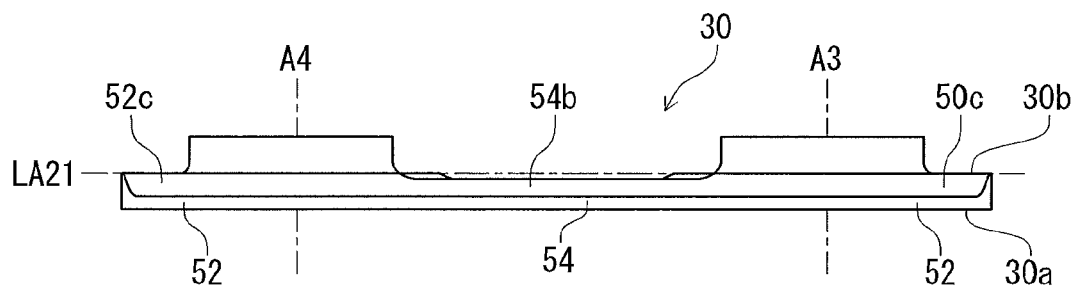
FIG. 18 is a bottom view of the first inner link plate illustrated in FIG. 15.
Figure 19:
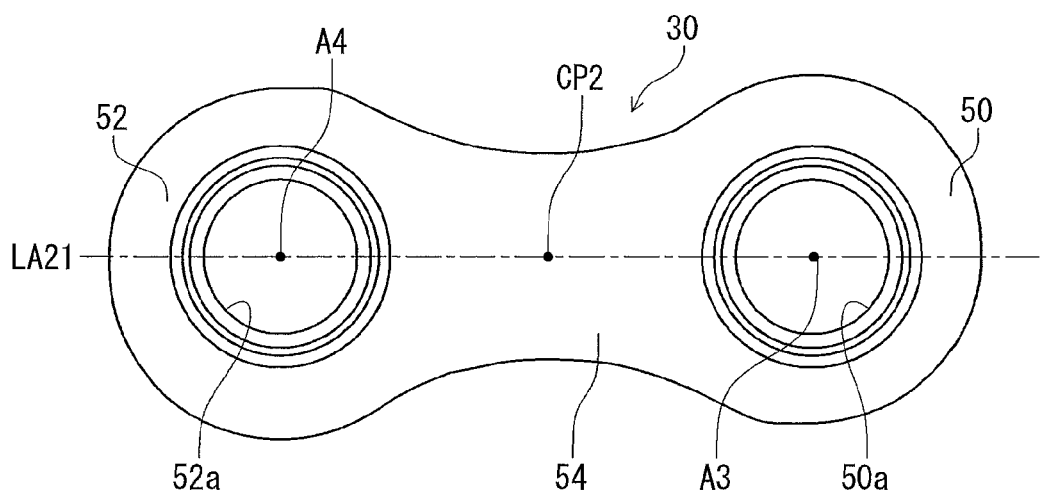
FIG. 19 is an inside elevational view of the first inner link plate illustrated in FIG. 15.

Referring to FIGS. 17 to 19, the first inner link plate 30 has a first inner-link longitudinal axis LA21 perpendicular to the third center axis A3 and the fourth center axis A4. The first inner-link longitudinal axis LA21 is defined at a center of the first inner link plate 30 in a direction along the third center axis A3 and the fourth center axis A4. The first inner link plate 30 extends along the first inner-link longitudinal axis LA21. Unlike the first outer link plate 28, the first inner link plate 30 is asymmetrical with respect to the first inner-link longitudinal axis LA21 when viewed from a direction parallel to the third center axis A3 and the fourth center axis A4. It will be apparent to those skilled in the bicycle field that the first inner link plate 30 can be symmetrical with respect to the first inner-link longitudinal axis LA21.

As illustrated in FIG. 18, the first inner link plate 30 includes a second interiorly facing surface 30a and a second exteriorly facing surface 30b. The second interiorly facing surface 30a is positioned closer to the bicycle frame 24 than the second exteriorly facing surface 30b in a state where the bicycle chain 12 is engaged with the bicycle rear sprocket 18.

As illustrated in FIGS. 17 to 19, the third chamfers 50b and 50c are provided on the second exteriorly facing surface 30b. The fourth chamfers 52b and 52c are provided on the second exteriorly facing surface 30b. The second intermediate chamfers 54a and 54b are provided on the second exteriorly facing surface 30b.

As illustrated in FIGS. 17 and 19, a second center point CP2 is defined on the first inner-link longitudinal axis LA21 of the first inner link plate 30. The second center point CP2 is provided at a center position between the third center axis A3 and the fourth center axis A4. The first inner link plate 30 is symmetrical with respect to the second center point CP2 when viewed from the direction parallel to the third center axis A3 and the fourth center axis A4. The third end portion 50 and the fourth end portion 52 are symmetrical with respect to the second center point CP2. The third chamfer 50b and the fourth chamfer 52c are symmetrical with respect to the second center point CP2. The third chamfer 50c and the fourth chamfer 52b are symmetrical with respect to the second center point CP2. The second intermediate chamfer 54a and the second intermediate chamfer 54b are symmetrical with respect to the second center point CP2. It will be apparent to those skilled in the bicycle field that the first inner link plate 30 can be asymmetrical with respect to the second center point CP2.

Figure 20:
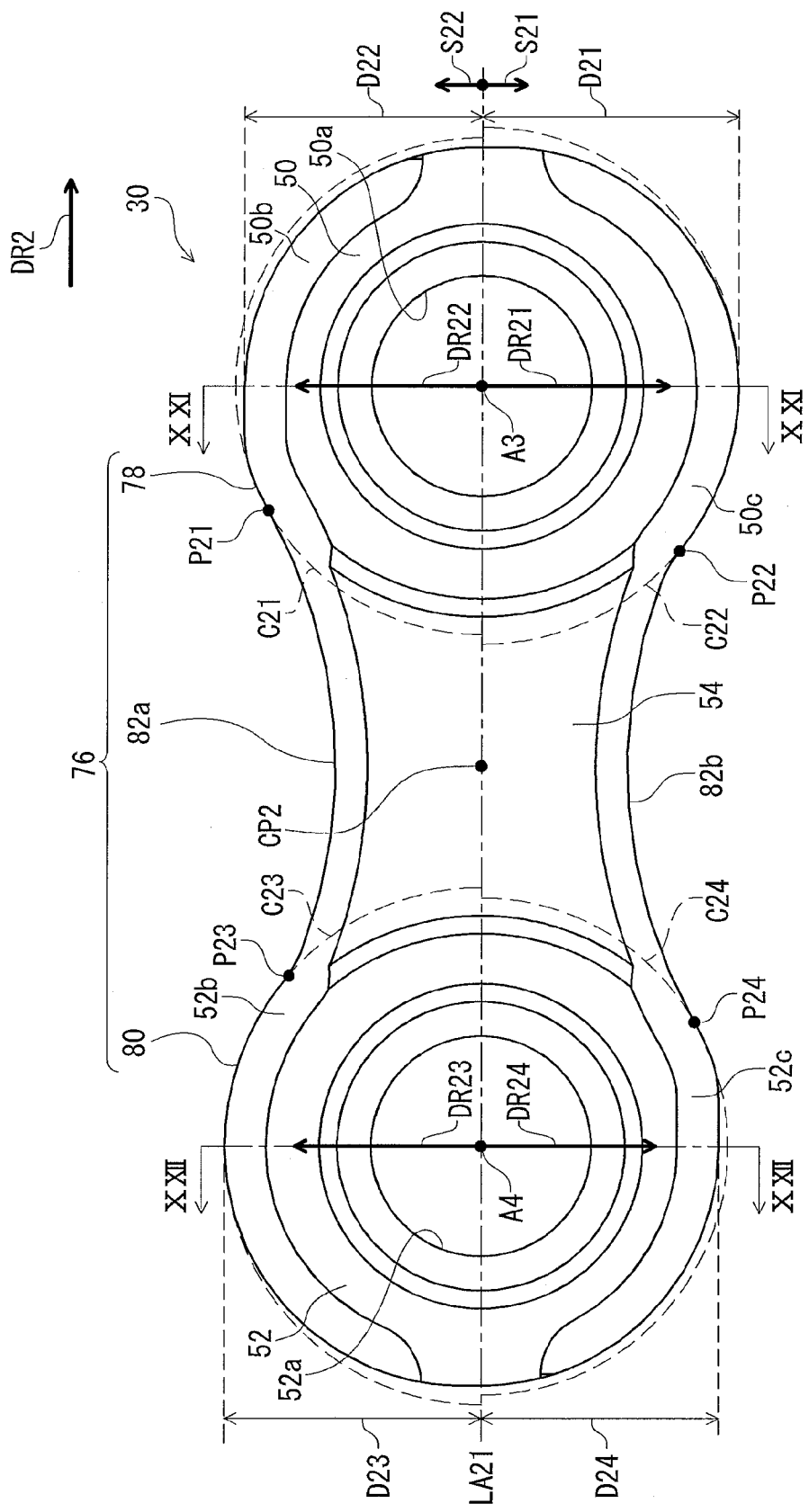
FIG. 20 is an outside elevational view of the first inner link plate illustrated in FIG. 15.

Referring to FIG. 20, the third end portion 50, the fourth end portion 52, and the second intermediate portion 54 define a second outer peripheral edge 76. In the illustrated embodiment, the second outer peripheral edge 76 is an outer peripheral surface of the first inner link plate 30. The second outer peripheral edge 76 is an outline of the first inner link plate 30 when viewed from a direction parallel to the third center axis A3 and the fourth center axis A4. The second outer peripheral edge 76 comprises a third end edge 78, a fourth end edge 80, and a pair of second intermediate edges 82a and 82b. The third end edge 78 extends about the third end portion 50. The fourth end edge 80 extends about the fourth end portion 52. The pair of second intermediate edges 82 extends along the second intermediate portion 54 between the third end edge 78 and the fourth end edge 80. The second intermediate edge 82a is provided on an opposite side of the second intermediate edge 82b with respect to the second outer-link longitudinal axis LA21.

As illustrated in FIG. 20, the third end edge 78 is defined between a first point P21 and a second point P22. The first point P21 is defined on a first virtual semicircle C21 having a center disposed on the third center axis A3. The first virtual semicircle C21 is defined on a second side S22 with respect to the first inner-link longitudinal axis LA21. The first virtual semicircle C21 is defined to substantially coincide with an outermost outline of the third end portion 50 having a maximum outer diameter on the second side S22 when viewed from a direction parallel to the third center axis A3 and the fourth center axis A4. The first point P21 is a point at which the first virtual semicircle C21 joins the outline of the first inner link plate 30 (the outermost outline of the third end portion 50) from the second intermediate portion 54. The second point P22 is defined on a second virtual semicircle C22 having a center disposed on the third center axis A3. The second virtual semicircle C22 is defined on a first side S21 with respect to the first inner-link longitudinal axis LA21. The second side S22 is opposite to the first side S21 with respect to the first inner-link longitudinal axis LA21. The second virtual semicircle C22 is defined to substantially coincide with the outermost outline of the third end portion 50 having a maximum outer diameter on the first side S21 when viewed from the direction parallel to the third center axis A3 and the fourth center axis A4. The second point P22 is a point at which the second virtual semicircle C22 joins the outline of the first inner link plate 30 (the outermost outline of the third end portion 50) from the second intermediate portion 54.

As illustrated in FIG. 20, the fourth end edge 80 is provided between a third point P23 and a fourth point P24. The third point P23 is defined on a third virtual semicircle C23 having a center disposed on the fourth center axis A4. The third virtual semicircle C23 is defined on the second side S22 with respect to the first inner-link longitudinal axis LA21. The third virtual semicircle C23 is defined to substantially coincide with an outermost outline of the fourth end portion 52 having a maximum outer diameter on the second side S22 when viewed from the direction parallel to the third center axis A3 and the fourth center axis A4. The third point P23 is a point at which the third virtual semicircle C23 joins the outline of the first inner link plate 30 (the outermost outline of the fourth end portion 52) from the second intermediate portion 54. The fourth point P24 is defined on a fourth virtual semicircle C24 having a center disposed on the fourth center axis A4. The fourth virtual semicircle C24 is defined on the first side S21 with respect to the first inner-link longitudinal axis LA21. The fourth virtual semicircle C24 is defined to substantially coincide with the outermost outline of the fourth end portion 52 having a maximum outer diameter on the first side S21 when viewed from the direction parallel to the third center axis A3 and the fourth center axis A4. The fourth point P24 is a point at which the fourth virtual semicircle C24 joins the outline of the first inner link plate 30 (the outermost outline of the fourth end portion 52) from the second intermediate portion 54.

As illustrated in FIGS. 20 to 22, a first inner-link distance D21 is defined from the third center axis A3 to the third end edge 78. More specifically, the first inner-link distance D21 is defined from the third center axis A3 to the third end edge 78 in a first direction DR21. The first direction DR21 radially outwardly extends from the third center axis A3 and is perpendicular to the third center axis A3. In the illustrated embodiment, the first direction DR21 is perpendicular to the first inner-link longitudinal axis LA21. The first direction DR21 is directed radially inwardly with respect to the rotation axis AR of the bicycle rear sprocket 18 in a state where the bicycle chain 12 engages with the bicycle rear sprocket 18.

A second inner-link distance D22 is defined from the third center axis A3 to the third end edge 78. More specifically, the second inner-link distance D22 is defined from the third center axis A3 to the third end edge 78 in a second direction DR22. The second direction DR22 radially outwardly extends from the third center axis A3 and is perpendicular to the third center axis A3. The second direction DR22 is different from the first direction DR21. In the illustrated embodiment, the second direction DR22 is perpendicular to the first inner-link longitudinal axis LA21. The first direction DR21 is opposite to the second direction DR22 with respect to the third center axis A3. The first direction DR21 is defined on the first side S21 with respect to the first inner-link longitudinal axis LA21. The second direction DR22 is defined on the second side S22 with respect to the first inner-link longitudinal axis LA21. The second direction DR22 is directed radially outwardly with respect to the rotation axis AR of the bicycle rear sprocket 18 in a state where the bicycle chain 12 engages with the bicycle rear sprocket 18. In the illustrated embodiment, the first inner-link distance D21 is larger than the second inner-link distance D22.

A third inner-link distance D23 is defined from the fourth center axis A4 to the fourth end edge 80. More specifically, the third inner-link distance D23 is defined from the fourth center axis A4 to the fourth end edge 80 in a third direction DR23. The third direction DR23 outwardly extends from the fourth center axis A4 and is perpendicular to the fourth center axis A4. In the illustrated embodiment, the third direction DR23 is perpendicular to the first inner-link longitudinal axis LA21. The third direction DR23 is directed radially outwardly with respect to the rotation axis AR of the bicycle rear sprocket 18 in a state where the bicycle chain 12 engages with the bicycle rear sprocket 18.

A fourth inner-link distance D24 is defined from the fourth center axis A4 to the fourth end edge 80. More specifically, the fourth inner-link distance D24 is defined from the fourth center axis A4 to the fourth end edge 80 in a fourth direction DR24. The fourth direction DR24 outwardly extends from the fourth center axis A4 and is perpendicular to the fourth center axis A4. The fourth direction DR24 is different from the third direction DR23. In the illustrated embodiment, the third direction DR23 is opposite to the fourth direction DR24 with respect to the fourth center axis A4. The third direction DR23 is defined on the second side S22 with respect to the first inner-link longitudinal axis LA21. The fourth direction DR24 is defined on the first side S21 with respect to the first inner-link longitudinal axis LA21. The fourth direction DR24 is directed radially inwardly with respect to the rotation axis AR of the bicycle rear sprocket 18 in a state where the bicycle chain 12 engages with the bicycle rear sprocket 18. In the illustrated embodiment, the third inner-link distance D23 is larger than the fourth inner-link distance D24. The third inner-link distance D23 is equal to the first inner-link distance D21. The fourth inner-link distance D24 is equal to the second inner-link distance D22.

Figure 23:
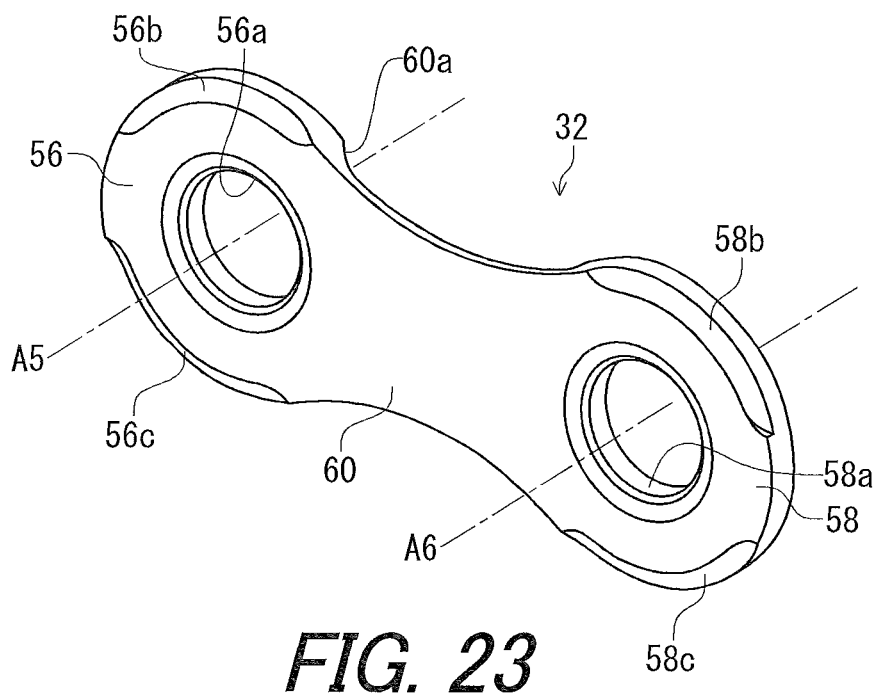
FIG. 23 is an outside perspective view of a second outer link plate illustrated in FIG. 6.
Figure 24:
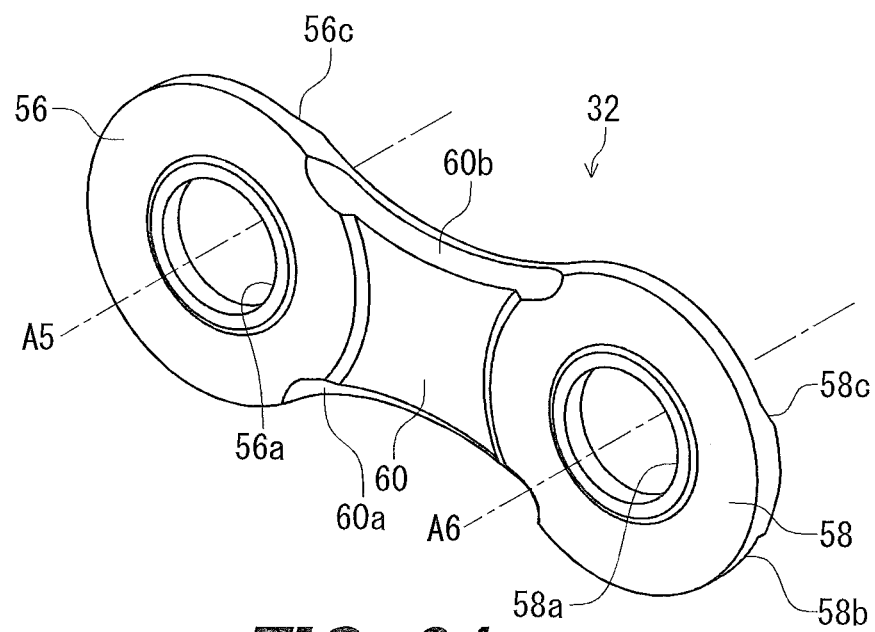
FIG. 24 is an inside perspective view of the second outer link plate illustrated in FIG. 23.

Referring to FIGS. 23 and 24, the fifth end portion 56 of the second outer link plate 32 includes fifth chamfers 56b and 56c. The fifth chamfers 56b and 56c have a substantially arc shape extending about the fifth opening 56a. The sixth end portion 58 includes sixth chamfers 58b and 58c. The sixth chamfers 58b and 58c have a substantially arc shape extending about the sixth opening 58a. The third intermediate portion 60 includes third intermediate chamfers 60a and 60b. The third intermediate chamfers 60a and 60b have a substantially arc shape and extend along the third intermediate portion 60 from the fifth end portion 56 to the sixth end portion 58.

Figure 25:
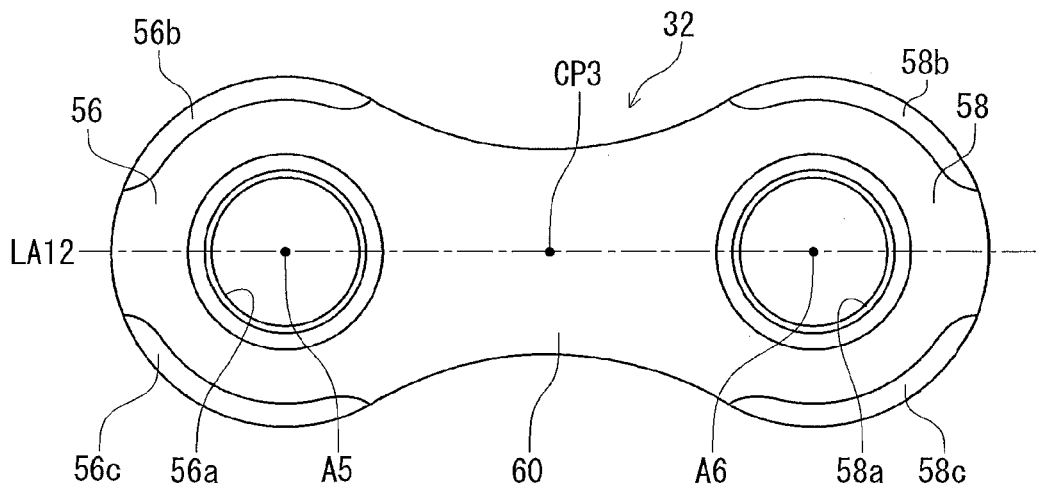
FIG. 25 is an outside elevational view of the second outer link plate illustrated in FIG. 23.
Figure 26:
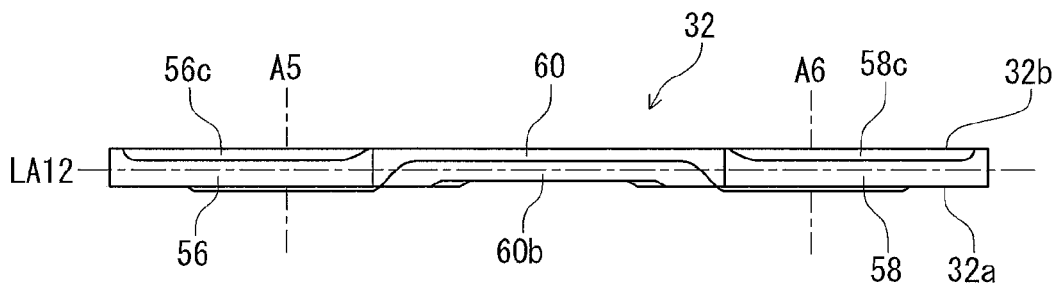
FIG. 26 is a bottom view of the second outer link plate illustrated in FIG. 23.
Figure 27:
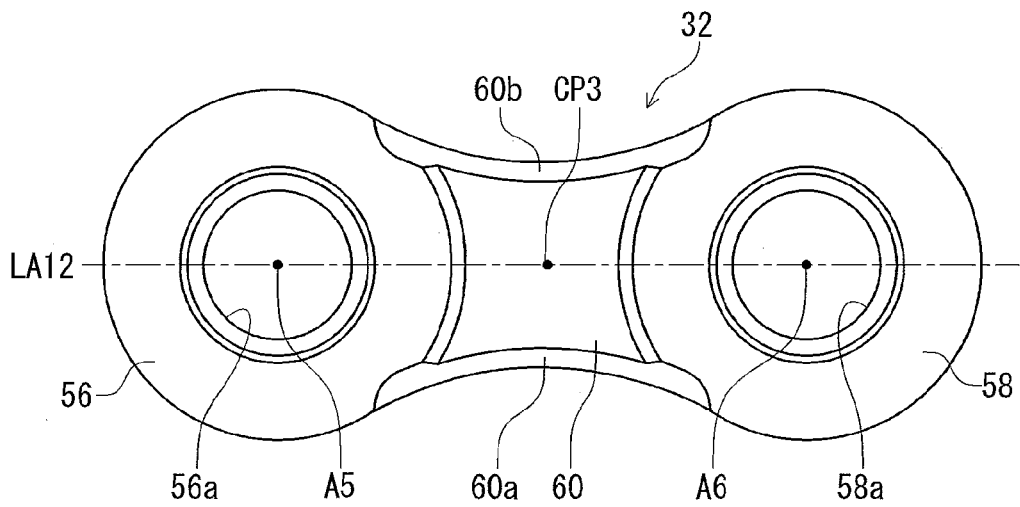
FIG. 27 is an inside elevational view of the second outer link plate illustrated in FIG. 23.

Referring to FIGS. 25 to 27, the second outer link plate 32 has a second outer-link longitudinal axis LA12 perpendicular to the fifth center axis A5 and the sixth center axis A6. The second outer-link longitudinal axis LA12 is defined at a center of the second outer link plate 32 in a direction along the fifth center axis A5 and the sixth center axis A6. The second outer link plate 32 extends along the second outer-link longitudinal axis LA12. The second outer link plate 32 is symmetrical with respect to the second outer-link longitudinal axis LA12 when viewed from a direction parallel to the fifth center axis A5 and the sixth center axis A6. It will be apparent to those skilled in the bicycle field that the second outer link plate 32 can be asymmetrical with respect to the second outer-link longitudinal axis LA12.

As illustrated in FIG. 26, the second outer link plate 32 includes a third interiorly facing surface 32a and a third exteriorly facing surface 32b. The third interiorly facing surface 32a is positioned closer to the bicycle frame 24 than the third exteriorly facing surface 32b in a state where the bicycle chain 12 is engaged with the bicycle rear sprocket 18.

As illustrated in FIGS. 25 to 27, the fifth chamfers 56b and 56c are provided on the third exteriorly facing surface 32b. The sixth chamfers 58b and 58c are provided on the third exteriorly facing surface 32b. The third intermediate chamfers 60a and 60b are provided on the third interiorly facing surface 32a.

As illustrated in FIGS. 25 and 27, a third center point CP3 is defined on the second outer-link longitudinal axis LA12 of the second outer link plate 32. The third center point CP3 is provided at a center position between the fifth center axis A5 and the sixth center axis A6. The second outer link plate 32 is symmetrical with respect to the third center point CP3 when viewed from the direction parallel to the fifth center axis A5 and the sixth center axis A6. It will be apparent to those skilled in the bicycle field that the second outer link plate 32 can be asymmetrical with respect to the third center point CP3.

Figure 28:
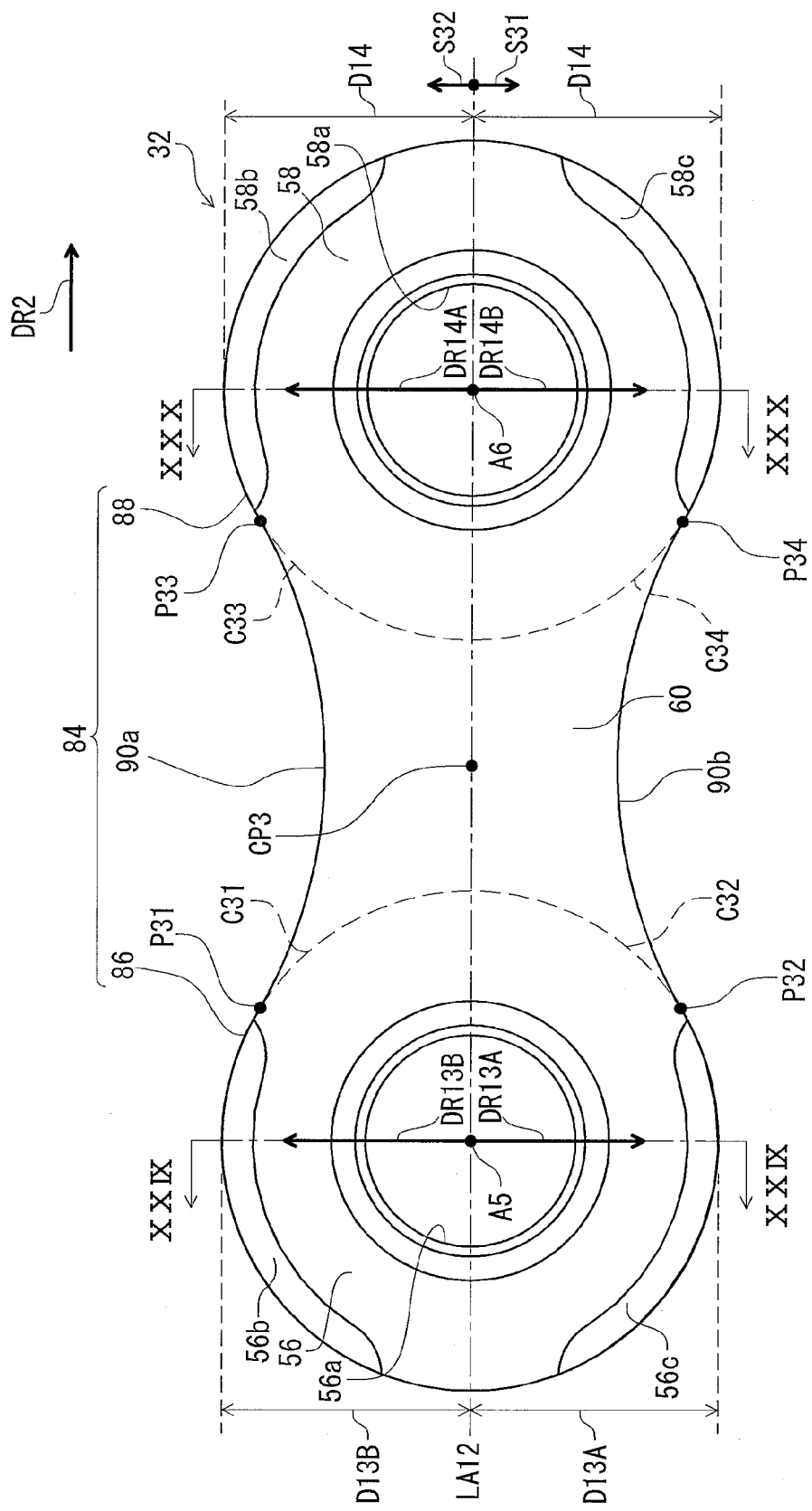
FIG. 28 is an outside elevational view of the second outer link plate illustrated in FIG. 23.

Referring to FIG. 28, the fifth end portion 56, the sixth end portion 58, and the third intermediate portion 60 define a third outer peripheral edge 84. In the illustrated embodiment, the third outer peripheral edge 84 is an outer peripheral surface of the second outer link plate 32. The third outer peripheral edge 84 is an outline of the second outer link plate 32 when viewed from a direction parallel to the fifth center axis A5 and the sixth center axis A6. The third outer peripheral edge 84 comprises a fifth end edge 86, a sixth end edge 88, and a pair of third intermediate edges 90a and 90b. The fifth end edge 86 extends about the fifth end portion 56. The sixth end edge 88 extends about the sixth end portion 58. The pair of third intermediate edges 90a and 90b extend along the third intermediate portion 60 between the fifth end edge 86 and the sixth end edge 88. The third intermediate edge 90a is provided on an opposite side of the third intermediate edge 90b with respect to the second outer-link longitudinal axis LA12.

As illustrated in FIG. 28, the fifth end edge 86 is defined between a first point P31 and a second point P32. The first point P31 is defined on a first virtual semicircle C31 having a center disposed on the fifth center axis A5. The first virtual semicircle C31 is defined on a second side S32 with respect to the second outer-link longitudinal axis LA12. The first virtual semicircle C31 is defined to substantially coincide with an outermost outline of the fifth end portion 56 having a maximum outer diameter on the second side S32 when viewed from a direction parallel to the fifth center axis A5 and the sixth center axis A6. The first point P31 is a point at which the first virtual semicircle C31 joins the outline of the second outer link plate 32 (the outermost outline of the fifth end portion 56) from the third intermediate portion 60. The second point P32 is defined on a second virtual semicircle C32 having a center disposed on the fifth center axis A5. The second virtual semicircle C32 is defined on a first side S31 with respect to the second outer-link longitudinal axis LA12. The second side S32 is opposite to the first side S31 with respect to the second outer-link longitudinal axis LA12. The second virtual semicircle C32 is defined to substantially coincide with the outermost outline of the fifth end portion 56 having a maximum outer diameter on the first side S31 when viewed from the direction parallel to the fifth center axis A5 and the sixth center axis A6. The second point P32 is a point at which the second virtual semicircle C32 joins the outline of the second outer link plate 32 (the outermost outline of the fifth end portion 56) from the third intermediate portion 60.

As illustrated in FIG. 28, the sixth end edge 88 is provided between a third point P33 and a fourth point P34. The third point P33 is defined on a third virtual semicircle C33 having a center disposed on the sixth center axis A6. The third virtual semicircle C33 is defined on the second side S32 with respect to the second outer-link longitudinal axis LA12. The third virtual semicircle C33 is defined to substantially coincide with an outermost outline of the sixth end portion 58 having a maximum outer diameter on the second side S32 when viewed from the direction parallel to the fifth center axis A5 and the sixth center axis A6. The third point P33 is a point at which the third virtual semicircle C33 joins the outline of the second outer link plate 32 (the outermost outline of the sixth end portion 58) from the third intermediate portion 60. The fourth point P34 is defined on a fourth virtual semicircle C34 having a center disposed on the sixth center axis A6. The fourth virtual semicircle C34 is defined on the first side S31 with respect to the second outer-link longitudinal axis LA12. The fourth virtual semicircle C34 is defined to substantially coincide with the outermost outline of the sixth end portion 58 having a maximum outer diameter on the first side S31 when viewed from the direction parallel to the fifth center axis A5 and the sixth center axis A6. The fourth point P34 is a point at which the fourth virtual semicircle C34 joins the outline of the second outer link plate 32 (the outermost outline of the sixth end portion 58) from the third intermediate portion 60.

Figure 30:
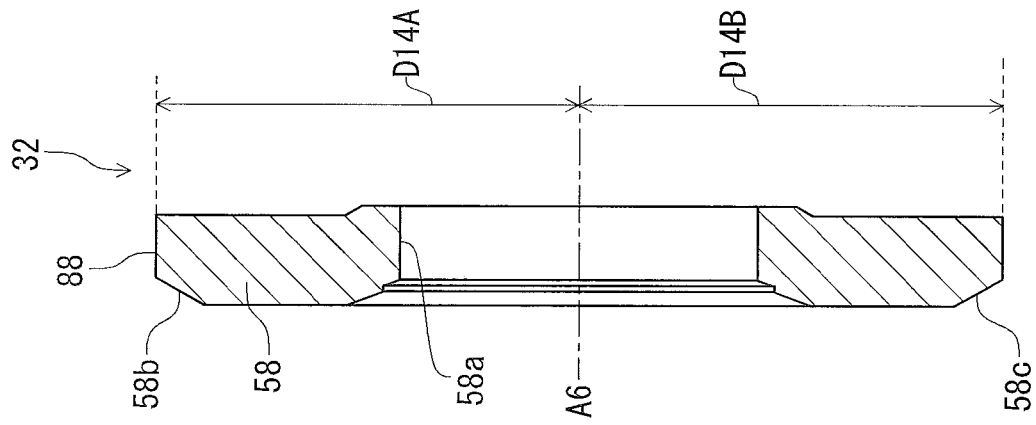
FIG. 30 is a cross sectional view of the second outer link plate taken along line XXX-XXX of the FIG. 28.
Figure 29:
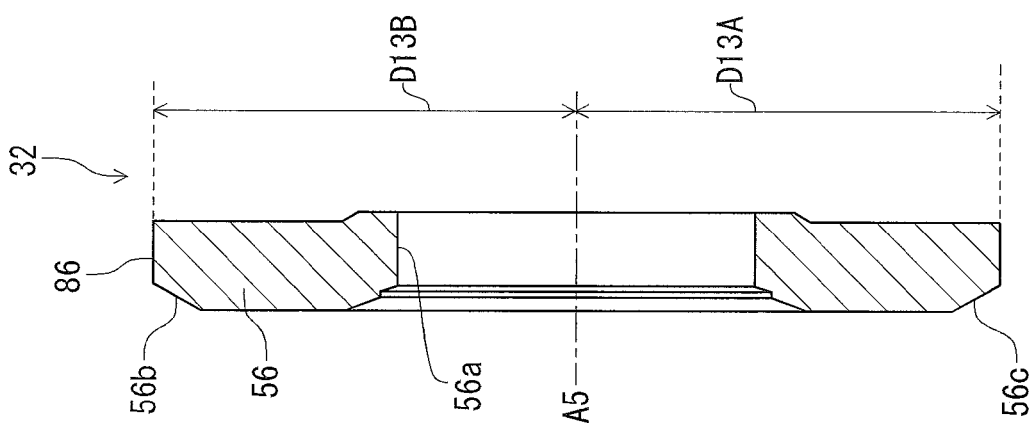
FIG. 29 is a cross sectional view of the second outer link plate taken along line XXIX-XXIX of the FIG. 28.

Referring to FIGS. 28 to 30, third outer-link distances D13A and D13B are defined from the fifth center axis A5 to the fifth end edge 86. More specifically, the third outer-link distance D13A is defined from the fifth center axis A5 to the fifth end edge 86 in a direction DR13A. The third outer-link distance D13B is defined from the fifth center axis A5 to the fifth end edge 86 in a direction DR13B. The directions DR13A and DR13B radially outwardly protrude from the fifth center axis A5 and are perpendicular to the fifth center axis A5. In the illustrated embodiment, the directions DR13A and DR13B are perpendicular to the second outer-link longitudinal axis LA12. The direction DR13A is opposite to the direction DR13B with respect to the fifth center axis A5. The direction DR13A is defined on the first side S31 with respect to the second outer-link longitudinal axis LA12. The direction DR13B is defined on the second side S32 with respect to the second outer-link longitudinal axis LA12. The direction DR13A is directed radially inwardly with respect to the rotation axis AR of the bicycle rear sprocket 18 in a state where the bicycle chain 12 engages with the bicycle rear sprocket 18. The direction DR13B is directed radially outwardly with respect to the rotation axis AR of the bicycle rear sprocket 18 in a state where the bicycle chain 12 engages with the bicycle rear sprocket 18. In the illustrated embodiment, the third outer-link distance D13A is equal to the third outer-link distance D13B. It will be apparent to those skilled in the bicycle field that the third outer-link distance D13A can be different from the third outer-link distance D13B.

Fourth outer-link distances D14A and D14B are defined from the sixth center axis A6 to the sixth end edge 88. More specifically, the fourth outer-link distance D14A is defined from the sixth center axis A6 to the sixth end edge 88 in a direction DR14A. The fourth outer-link distance D14B is defined from the sixth center axis A6 to the sixth end edge 88 in a direction DR14B. The directions DR14A and DR14B radially outwardly protrude from the sixth center axis A6 and are perpendicular to the sixth center axis A6. In the illustrated embodiment, the directions DR14A and DR14B are perpendicular to the second outer-link longitudinal axis LA12. The direction DR14A is opposite to the direction DR14B with respect to the sixth center axis A6. The direction DR14A is defined on the second side S32 with respect to the second outer-link longitudinal axis LA12. The direction DR14B is defined on the first side S31 with respect to the second outer-link longitudinal axis LA12. The direction DR14A is directed radially outwardly with respect to the rotation axis AR of the bicycle rear sprocket 18 in a state where the bicycle chain 12 engages with the bicycle rear sprocket 18. The direction DR14B is directed radially inwardly with respect to the rotation axis AR of the bicycle rear sprocket 18 in a state where the bicycle chain 12 engages with the bicycle rear sprocket 18. In the illustrated embodiment, the fourth outer-link distance D14A is equal to the fourth outer-link distance D14B. The fourth outer-link distances D14A and D14B are equal to the third outer-link distances D13A and D13B, respectively. It will be apparent to those skilled in the bicycle field that the fourth outer-link distance D14A can be different from the fourth outer-link distance D14B. It will be apparent to those skilled in the bicycle field that the fourth outer-link distances D14A and D14B can be different from the third outer-link distances D13A and D13B.

Figure 31:
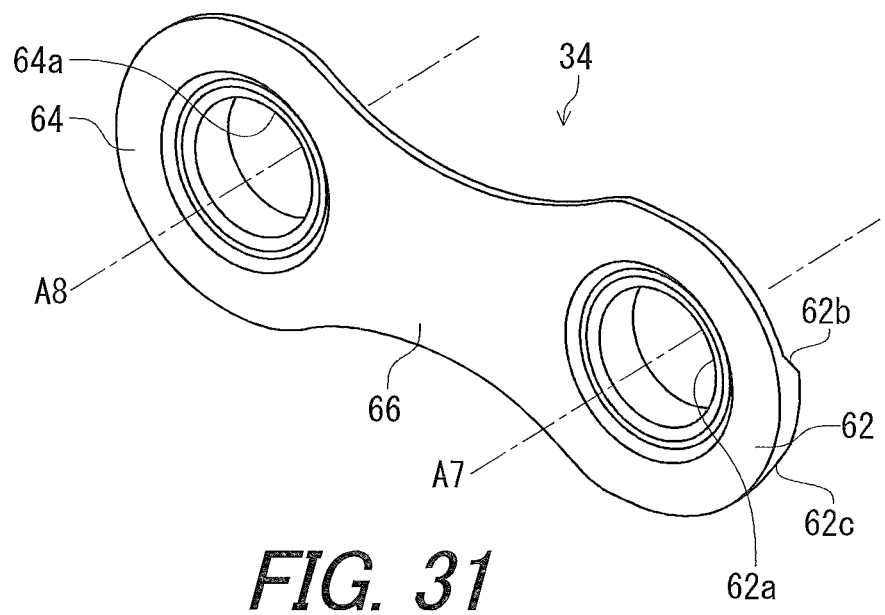
FIG. 31 is an outside perspective view of a second inner link plate illustrated in FIG. 6.
Figure 32:
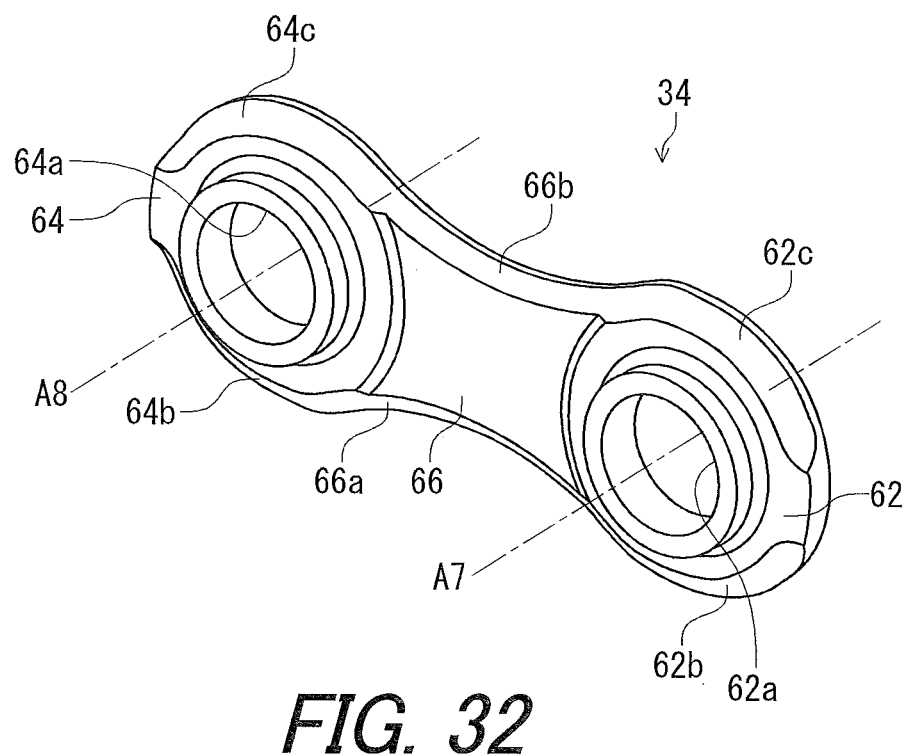
FIG. 32 is an inside perspective view of the second inner link plate illustrated in FIG. 31.

Referring to FIGS. 31 and 32, the seventh end portion 62 of the second inner link plate 34 includes seventh chamfers 62*b* and 62*c*. The seventh chamfers 62*b* and 62*c* have a substantially arc shape extending about the seventh opening 62*a*. The eighth end portion 64 includes eighth chamfers 64*b* and 64*c*. The eighth chamfers 64*b* and 64*c* have a substantially arc shape extending about the eighth opening 64*a*. The fourth intermediate portion 66 includes fourth intermediate chamfers 66*a* and 66*b*. The fourth intermediate chamfers 66*a* and 66*b* have a substantially arc shape and extend along the fourth intermediate portion 66 from the seventh end portion 62 to the eighth end portion 64.

Figure 33:
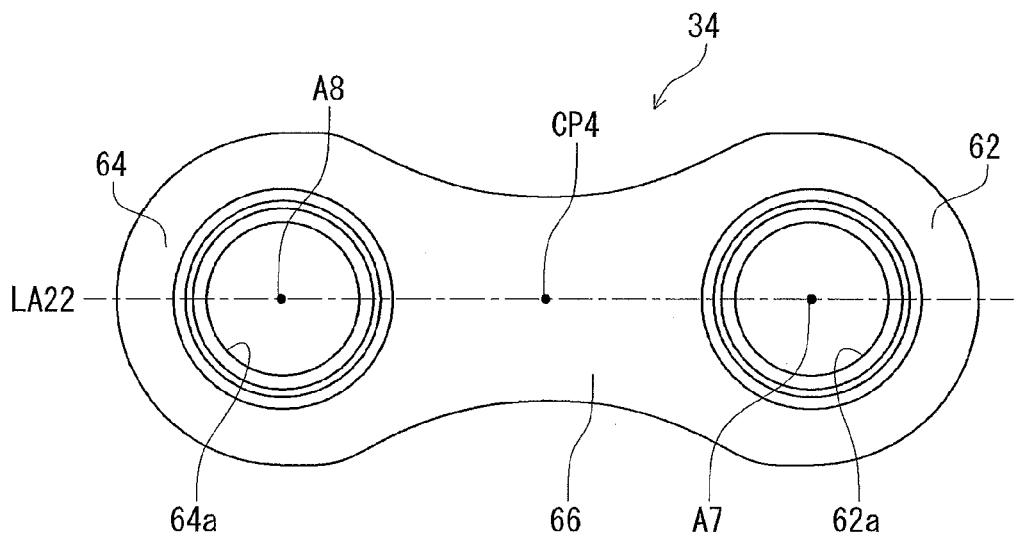
FIG. 33 is an outside elevational view of the second inner link plate illustrated in FIG. 31.
Figure 34:
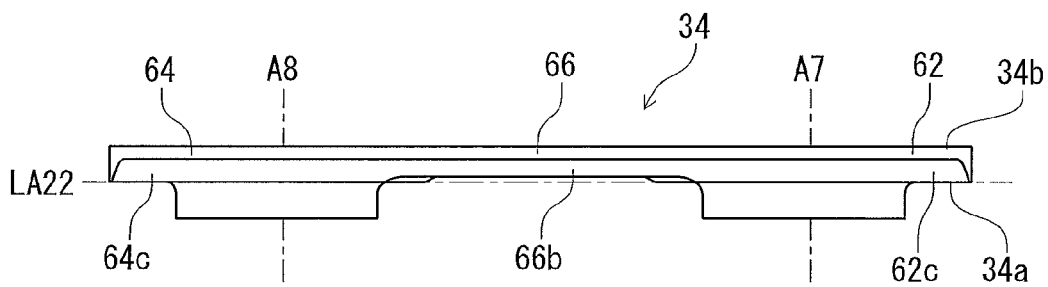
FIG. 34 is a bottom view of the second inner link plate illustrated in FIG. 31.
Figure 35:
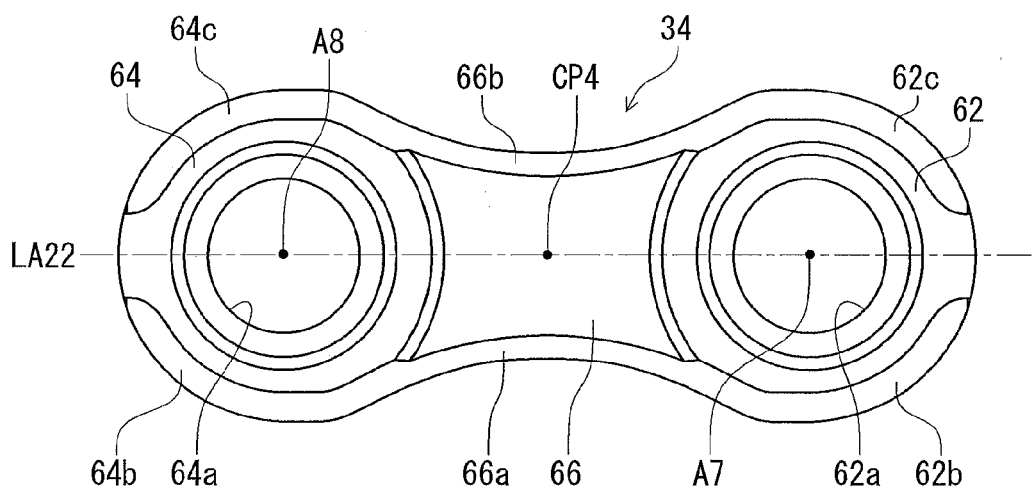
FIG. 35 is an inside elevational view of the second inner link plate illustrated in FIG. 31.

Referring to FIGS. 33 to 35, the second inner link plate 34 has a second inner-link longitudinal axis LA22 perpendicular to the seventh center axis A7 and the eighth center axis A8. The second inner-link longitudinal axis LA22 is defined at a center of the second inner link plate 34 in a direction along the seventh center axis A7 and the eighth center axis A8. The second inner link plate 34 extends along the second inner-link longitudinal axis LA22. The second inner link plate 34 is symmetrical with respect to the second inner-link longitudinal axis LA22 when viewed from a direction parallel to the seventh center axis A7 and the eighth center axis A8. It will be apparent to those skilled in the bicycle field that the second inner link plate 34 can be asymmetrical with respect to the second inner-link longitudinal axis LA22.

As illustrated in FIG. 34, the second inner link plate 34 includes a fourth interiorly facing surface 34*a* and a fourth exteriorly facing surface 34*b*. The fourth interiorly facing surface 34*a* is positioned closer to the bicycle frame 24 than the fourth exteriorly facing surface 34*b* in a state where the bicycle chain 12 is engaged with the bicycle rear sprocket 18.

As illustrated in FIGS. 33 to 35, the seventh chamfers 62*b* and 62*c* are provided on the fourth interiorly facing surface 34*a*. The eighth chamfers 64*b* and 64*c* are provided on the fourth interiorly facing surface 34*a*. The fourth intermediate chamfers 66*a* and 66*b* are provided on the fourth interiorly facing surface 34*a*.

As illustrated in FIGS. 33 and 34, a fourth center point CP4 is defined on the second inner-link longitudinal axis LA22 of the second inner link plate 34. The fourth center point CP4 is provided at a center position between the seventh center axis A7 and the eighth center axis A8. The second inner link plate 34 has a symmetrical shape with respect to the fourth center point CP4 when viewed from the direction parallel to the seventh center axis A7 and the eighth center axis A8. It will be apparent to those skilled in the bicycle field that the second inner link plate 34 can be asymmetrical with respect to the fourth center point CP4.

Figure 36:
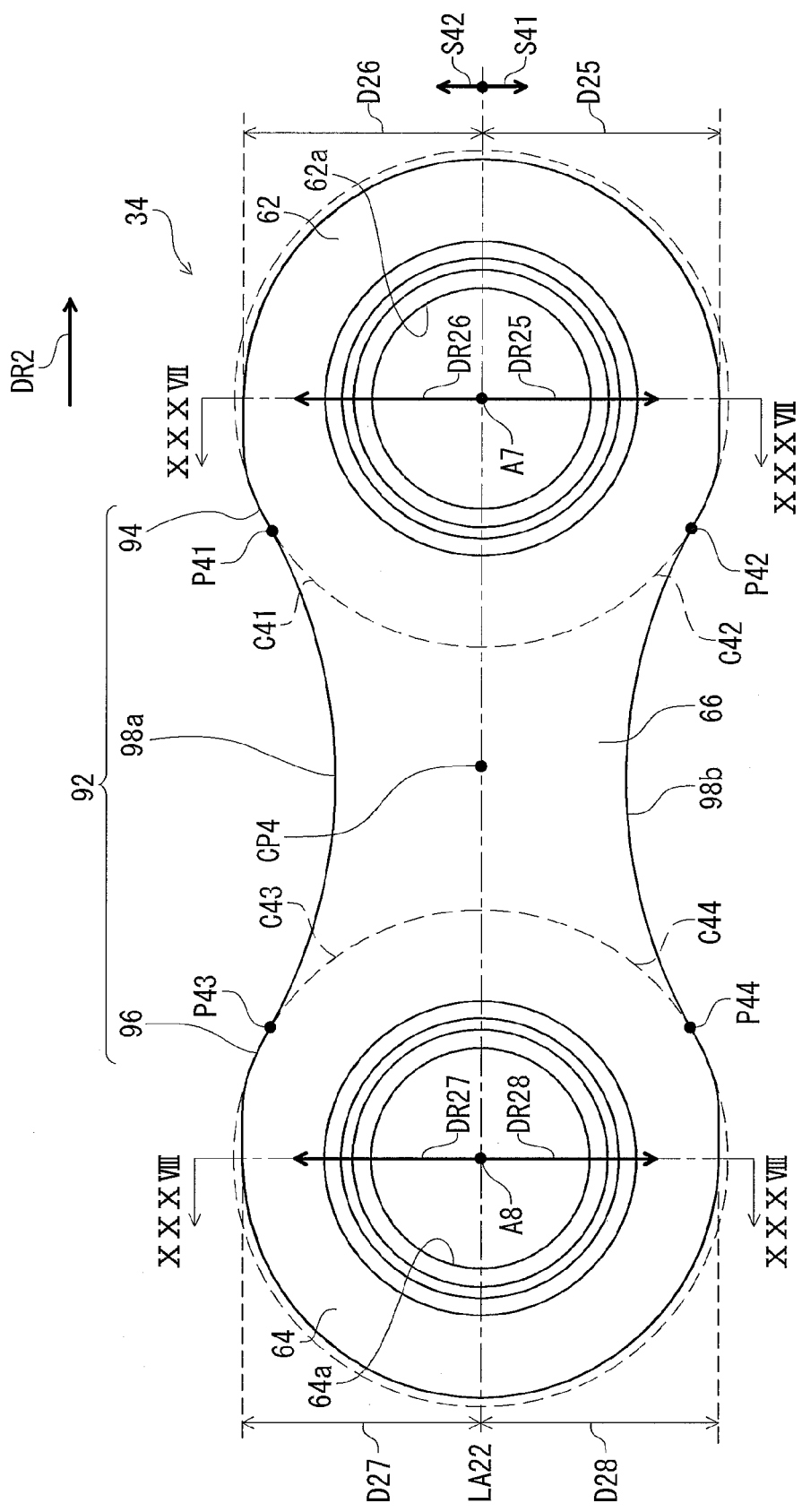
FIG. 36 is an outside elevational view of the second inner link plate illustrated in FIG. 31.

Referring to FIG. 36, the seventh end portion 62, the eighth end portion 64, and the fourth intermediate portion 66 define a fourth outer peripheral edge 92. In the illustrated embodiment, the fourth outer peripheral edge 92 is an outer peripheral surface of the second inner link plate 34. The fourth outer peripheral edge 92 is an outline of the second inner link plate 34 when viewed from a direction parallel to the seventh center axis A7 and the eighth center axis A8. The fourth outer peripheral edge 92 comprises a seventh end edge 94, a eighth end edge 96, and a pair of fourth intermediate edges 98*a* and 98*b*. The seventh end edge 94 extends about the seventh end portion 62. The eighth end edge 96 extends about the eighth end portion 64. The pair of fourth intermediate edges 98*a* and 98*b* extend along the fourth intermediate portion 66 between the seventh end edge 94 and the eighth end edge 96. The fourth intermediate edge 98*a* is provided on an opposite side of the fourth intermediate edge 98*b* with respect to the second inner-link longitudinal axis LA22.

As illustrated in FIG. 36, the seventh end edge 94 is defined between a first point P41 and a second point P42. The first point P41 is defined on a first virtual semicircle C41 having a center disposed on the seventh center axis A7. The first virtual semicircle C41 is defined on a second side S42 with respect to the second inner-link longitudinal axis LA22. The first virtual semicircle C41 is defined to substantially coincide with an outermost outline of the seventh end portion 62 having a maximum outer diameter o the second side S42 when viewed from a direction parallel to the seventh center axis A7 and the eighth center axis A8. The first point P41 is a point at which the first virtual semicircle C41 joins the outline of the second inner link plate 34 (the outermost outline of the seventh end portion 62) from the fourth intermediate portion 66. The second point P42 is defined on a second virtual semicircle C42 having a center disposed on the seventh center axis A7. The second virtual semicircle C42 is defined on a first side S41 with respect to the second inner-link longitudinal axis LA22. The second side S42 is opposite to the first side S41 with respect to the second inner-link longitudinal axis LA22. The second virtual semicircle C42 is defined to substantially coincide with the outermost outline of the seventh end portion 62 having a maximum outer diameter on the first side S41 when viewed from the direction parallel to the seventh center axis A7 and the eighth center axis A8. The second point P42 is a point at which the second virtual semicircle C42 joins the outline of the second inner link plate 34 (the outermost outline of the seventh end portion 62) from the fourth intermediate portion 66.

As illustrated in FIG. 36, the eighth end edge 96 is provided between a third point P43 and a fourth point P44. The third point P43 is defined on a third virtual semicircle C43 having a center disposed on the eighth center axis A8. The third virtual semicircle C43 is defined on the second side S42 with respect to the second inner-link longitudinal axis LA22. The third virtual semicircle C43 is defined to substantially coincide with an outermost outline of the eighth end portion 64 having a maximum outer diameter of the second side S42 when viewed from the direction parallel to the seventh center axis A7 and the eighth center axis A8. The third point P43 is a point at which the third virtual semicircle C43 joins the outline of the second inner link plate 34 (the outermost outline of the eighth end portion 64) from the fourth intermediate portion 66. The fourth point P44 is defined on a fourth virtual semicircle C44 having a center disposed on the eighth center axis A8. The fourth virtual semicircle C44 is defined on the first side S41 with respect to the second inner-link longitudinal axis LA22. The fourth virtual semicircle C44 is defined to substantially coincide with the outermost outline of the eighth end portion 64 having a maximum outer diameter on the first side S41 when viewed from the direction parallel to the seventh center axis A7 and the eighth center axis A8. The fourth point P44 is a point at which the fourth virtual semicircle C44 joins the outline of the second inner link plate 34 (the outermost outline of the eighth end portion 64) from the fourth intermediate portion 66.

Figure 38:
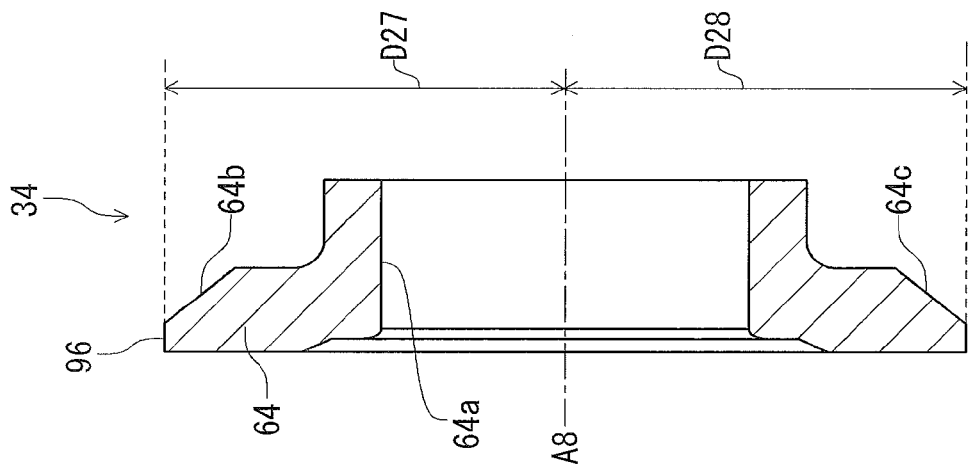
FIG. 38 is a cross sectional view of the second inner link plate taken along line XXXVIII-XXXVIII of the FIG. 36.
Figure 37:
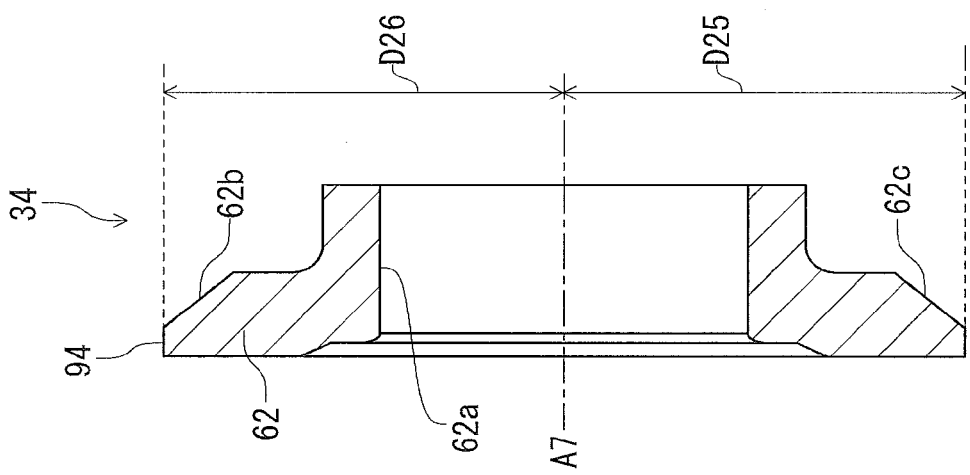
FIG. 37 is a cross sectional view of the second inner link plate taken along line XXXVII-XXXVII of the FIG. 36.

Referring to FIGS. 36 to 38, a fifth inner-link distance D25 is defined from the seventh center axis A7 to the seventh end edge 94. More specifically, the fifth inner-link distance D25 is defined from the seventh center axis A7 to the seventh end edge 94 in a fifth direction DR25. The fifth direction DR25 radially outwardly extends from the seventh center axis A7 and is perpendicular to the seventh center axis A7. In the illustrated embodiment, the fifth direction DR25 is perpendicular to the second inner-link longitudinal axis LA22. The fifth direction DR25 is directed radially inwardly with respect to the rotation axis AR of the bicycle rear sprocket 18 in a state where the bicycle chain 12 engages with the bicycle rear sprocket 18.

A sixth inner-link distance D26 is defined from the seventh center axis A7 to the seventh end edge 94. More specifically, the sixth inner-link distance D26 is defined from the seventh center axis A7 to the seventh end edge 94 in a sixth direction DR26. The sixth direction DR26 radially outwardly extends from the seventh center axis A7 and is perpendicular to the seventh center axis A7. The sixth direction DR26 is different from the fifth direction DR25. In the illustrated embodiment, the sixth direction DR26 is perpendicular to the second inner-link longitudinal axis LA22. The fifth direction DR25 is opposite to the sixth direction DR26 with respect to the seventh center axis A7. The fifth direction DR25 is defined on the first side S41 with respect to the second inner-link longitudinal axis LA22. The sixth direction DR26 is defined on the second side S42 with respect to the second inner-link longitudinal axis LA22. The sixth direction DR26 is directed radially outwardly with respect to the rotation axis AR of the bicycle rear sprocket 18 in a state where the bicycle chain 12 engages with the bicycle rear sprocket 18. In the illustrated embodiment, the sixth inner-link distance D26 is equal to the fifth inner-link distance D25.

A seventh inner-link distance D27 is defined from the eighth center axis A8 to the eighth end edge 96. More specifically, the seventh inner-link distance D27 is defined from the eighth center axis A8 to the eighth end edge 96 in a seventh direction DR27. The seventh direction DR27 radially outwardly extends from the eighth center axis A8 and is perpendicular to the eighth center axis A8. In the illustrated embodiment, the seventh direction DR27 is perpendicular to the second inner-link longitudinal axis LA22. The seventh direction DR27 is directed radially outwardly with respect to the rotation axis AR of the bicycle rear sprocket 18 in a state where the bicycle chain 12 engages with the bicycle rear sprocket 18.

An eighth inner-link distance D28 is defined from the eighth center axis A8 to the eighth end edge 96. More specifically, the eighth inner-link distance D28 is defined from the eighth center axis A8 to the eighth end edge 96 in an eighth direction DR28. The eighth direction DR28 radially outwardly extends from the eighth center axis A8 and is perpendicular to the eighth center axis A8. The eighth direction DR28 is different from the seventh direction DR27. In the illustrated embodiment, the seventh direction DR27 is perpendicular to the second inner-link longitudinal axis LA22. The seventh direction DR27 is opposite to the eighth direction DR28 with respect to the eighth center axis A8. The seventh direction DR27 is defined on the second side S42 with respect to the second inner-link longitudinal axis LA22. The eighth direction DR28 is defined on the first side S41 with respect to the second inner-link longitudinal axis LA22. The eighth direction DR28 is directed radially inwardly with respect to the rotation axis AR of the bicycle rear sprocket 18 in a state where the bicycle chain 12 engages with the bicycle rear sprocket 18. In the illustrated embodiment, the eighth inner-link distance D28 is equal to the seventh inner-link distance D27.

Figure 39:
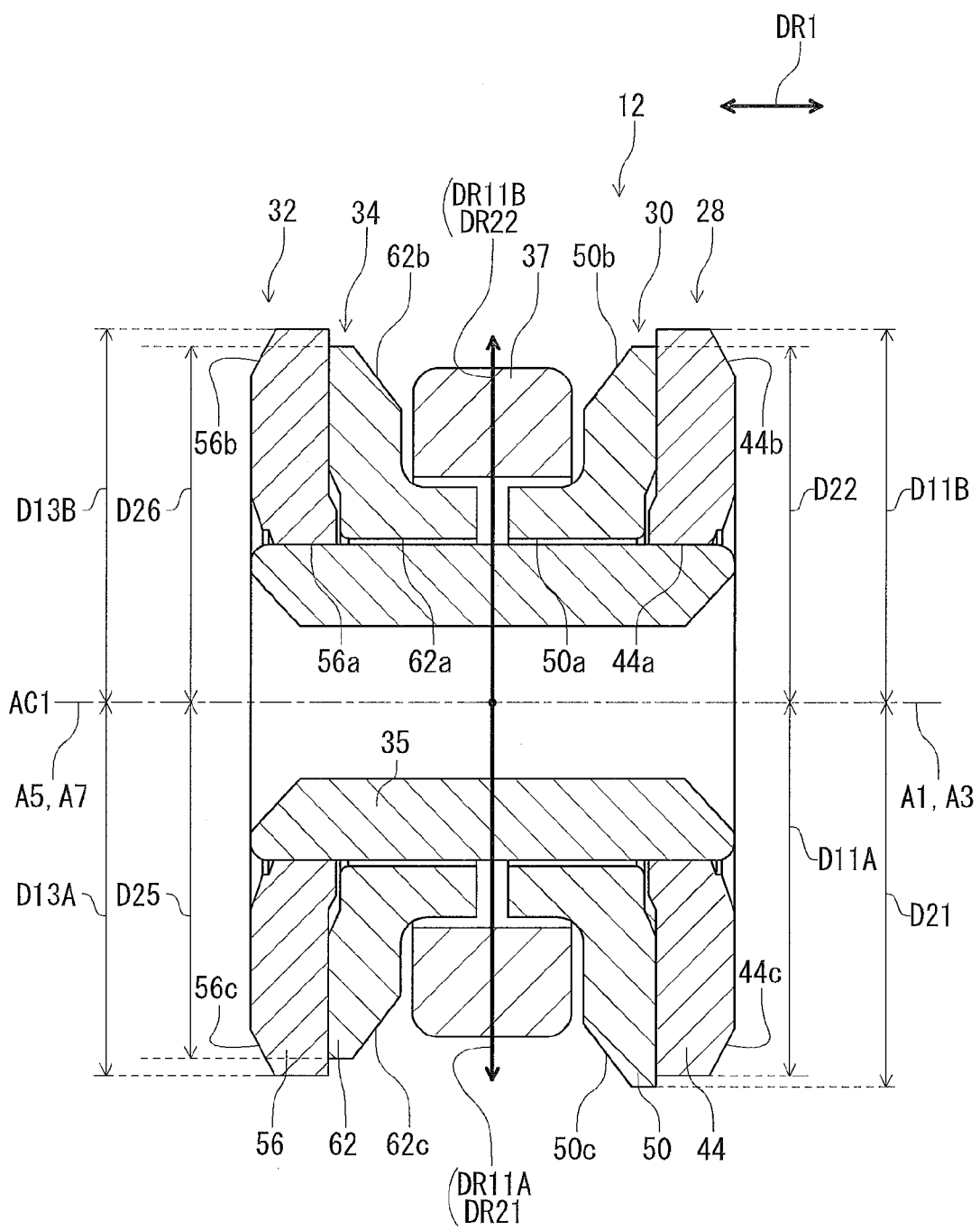
FIG. 39 is a cross sectional view of the bicycle chain taken along line XXXIX-XXXIX of the FIG. 4.

Referring to FIG. 39, the first inner-link distance D21 is larger than the second inner-link distance D22 and the first outer-link distances D11A and D11B. The second inner-link distance D22 is smaller than the first outer-link distances D11A and D11B. The fifth inner-link distance D25 is smaller than the third outer-link distance D13A. The sixth inner-link distance D26 is smaller than the third outer-link distance D13B.

Since the first inner-link distance D21 is larger than the first outer-link distance D11A, the third end portion 50 of the first inner link plate 30 protrudes from the first end portion 44 of the first outer link plate 28 in the first direction DR21 (the direction DR11A). Since the second inner-link distance D22 is smaller than the first outer-link distance D11B, the first end portion 44 of the first outer link plate 28 protrudes from the third end portion 50 of the first inner link plate 30 in the second direction DR22 (the direction DR11B). It will be apparent to those skilled in the bicycle field that the second inner-link distance D22 can be equal to the first outer-link distances D11A and D11B. It will be apparent to those skilled in the bicycle field that the fifth inner-link distance D25 can be equal to the third outer-link distance D13A. It will be apparent to those skilled in the bicycle field that the sixth inner-link distance D26 can be equal to the third outer-link distance D13B.

Figure 40:
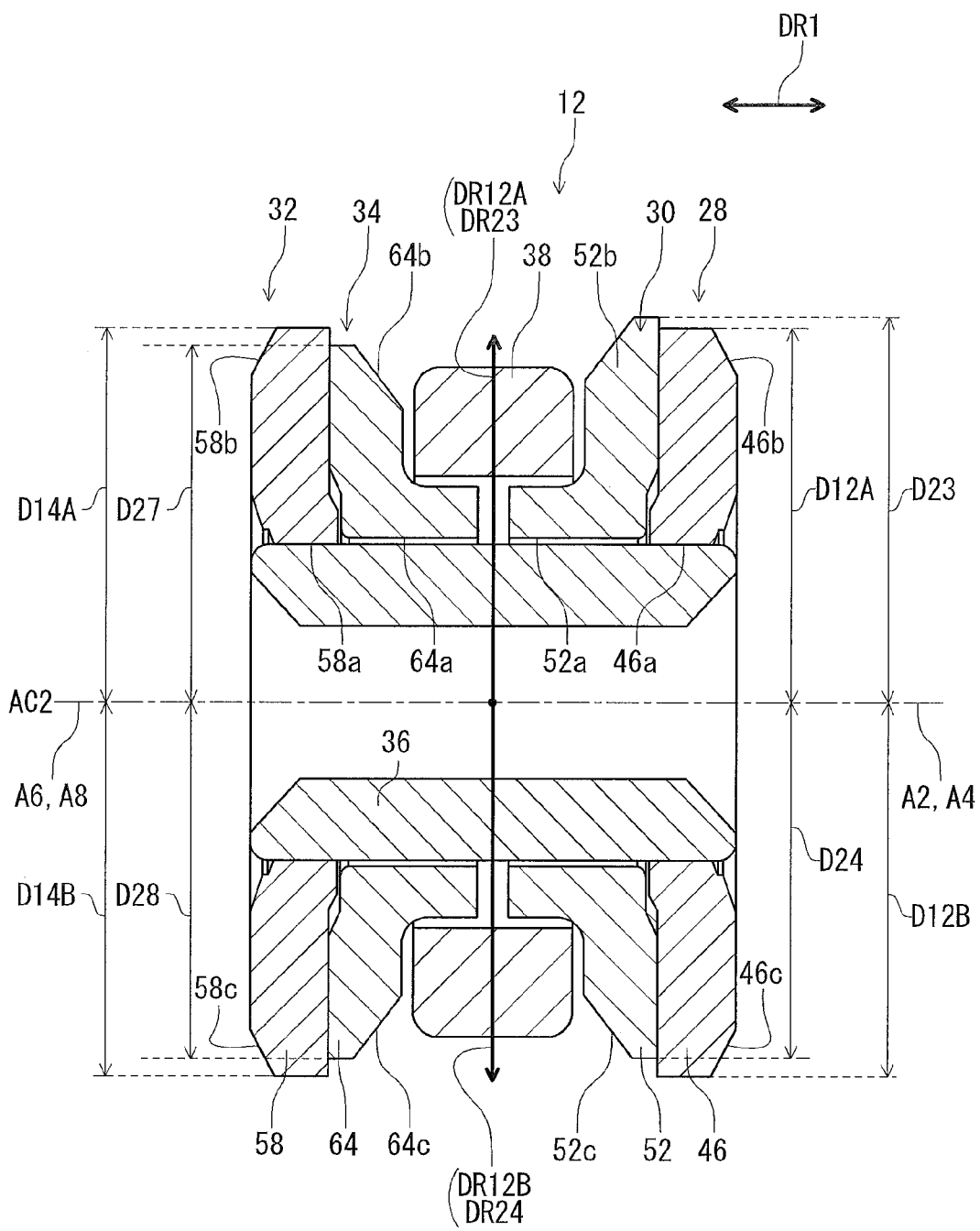
FIG. 40 is a cross sectional view of the bicycle chain taken along line XXXX-XXXX of the FIG. 4.

Referring to FIG. 40, the third inner-link distance D23 is larger than the fourth inner-link distance D24 and the second outer-link distances D12A and D12B. The fourth inner-link distance D24 is smaller than the second outer-link distances D12A and D12B. The seventh inner-link distance D27 is smaller than the fourth outer-link distance D14A. The eighth inner-link distance D28 is smaller than the fourth outer-link distance D14B.

Since the third inner-link distance D23 is larger than the second outer-link distance D12A, the fourth end portion 52 of the first inner link plate 30 protrudes from the second end portion 46 of the first outer link plate 28 in the third direction DR23 (the direction DR12A). Since the fourth inner-link distance D24 is smaller than the second outer-link distance D12B, the second end portion 46 of the first outer link plate 28 protrudes from the fourth end portion 52 of the first inner link plate 30 in the fourth direction DR24 (the direction DR12B). It will be apparent to those skilled in the bicycle field that the fourth inner-link distance D24 can be equal to the second outer-link distances D12A and D12B. It will be apparent to those skilled in the bicycle field that the seventh inner-link distance D27 can be equal to the fourth outer-link distance D14A. It will be apparent to those skilled in the bicycle field that the eighth inner-link distance D28 can be equal to the fourth outer-link distance D14B.

Figure 41:
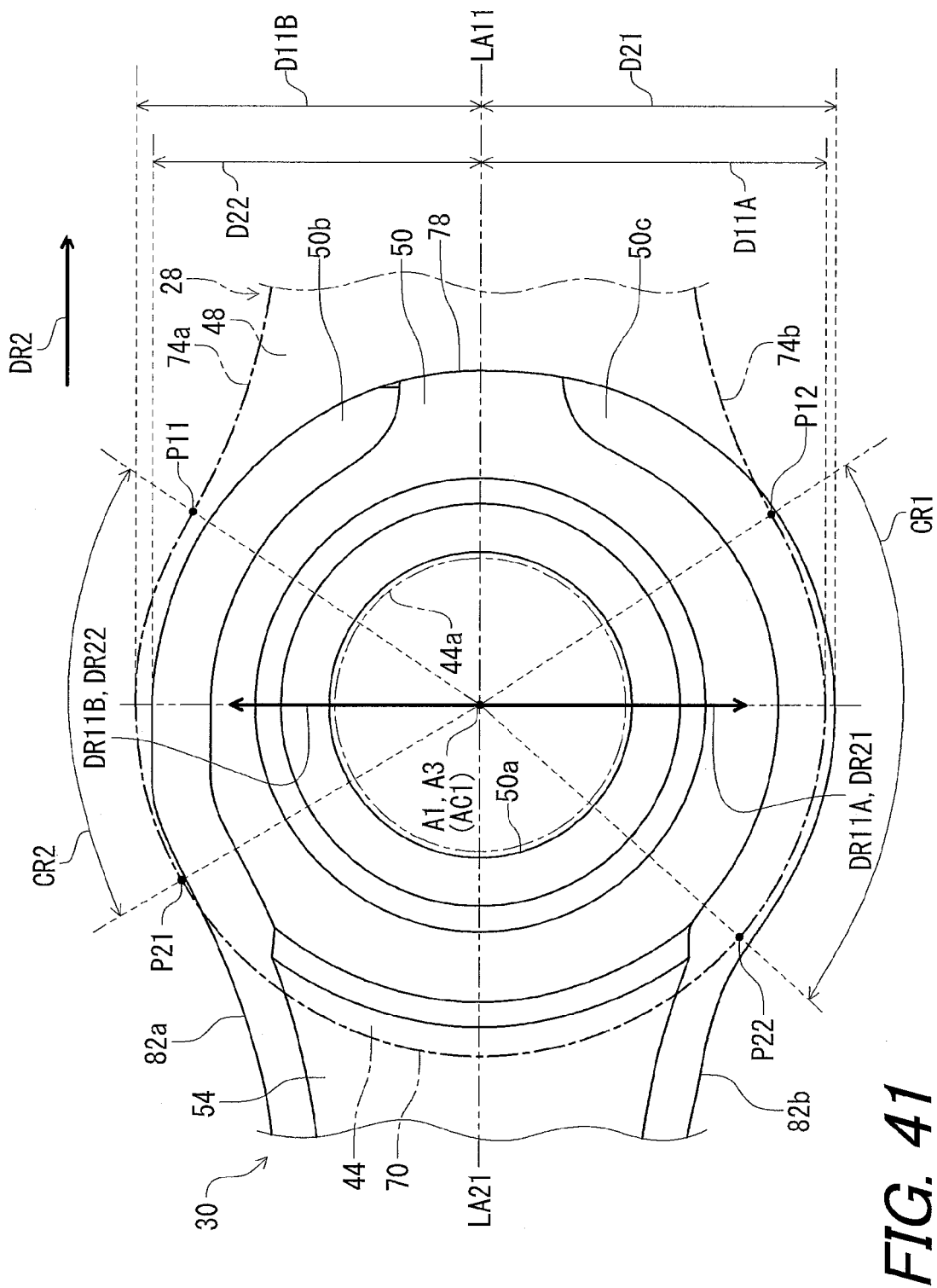
FIG. 41 is an outside partial elevational view of the first outer link plate and the first inner link plate.

Referring to FIG. 41, the first outer-link distance D11A is defined from the first center axis A1 to the first end edge 70 in the first direction DR21 in a state where the first inner-link longitudinal axis LA21 is parallel to the first outer-link longitudinal axis LA11. The first outer-link distance D11B is defined from the first center axis A1 to the first end edge 70 in the second direction DR22 in a state where the first inner-link longitudinal axis LA21 is parallel to the first outer-link longitudinal axis LA11.

Referring to FIG. 41, the third end portion 50 of the first inner link plate 30 protrudes from the first end portion 44 of the first outer link plate 28 in the first direction DR21 (the direction DR11A) within a first circumferential range CR1 defined between the second point P12 and the second point P22. It will be apparent to those skilled in the bicycle field that the first inner-link distance D21 and the first outer-link distance D11A can be defined within the first circumferential range CR1. The first end portion 44 of the first outer link plate 28 protrudes from the third end portion 50 of the first inner link plate 30 in the second direction DR22 (the direction DR11B) within a second circumferential range CR2 defined between the first point P11 and the first point P21. It will be apparent to those skilled in the bicycle field that the second inner-link distance D22 and the first outer-link distance D11B can be defined within the second circumferential range CR2.

Figure 42:
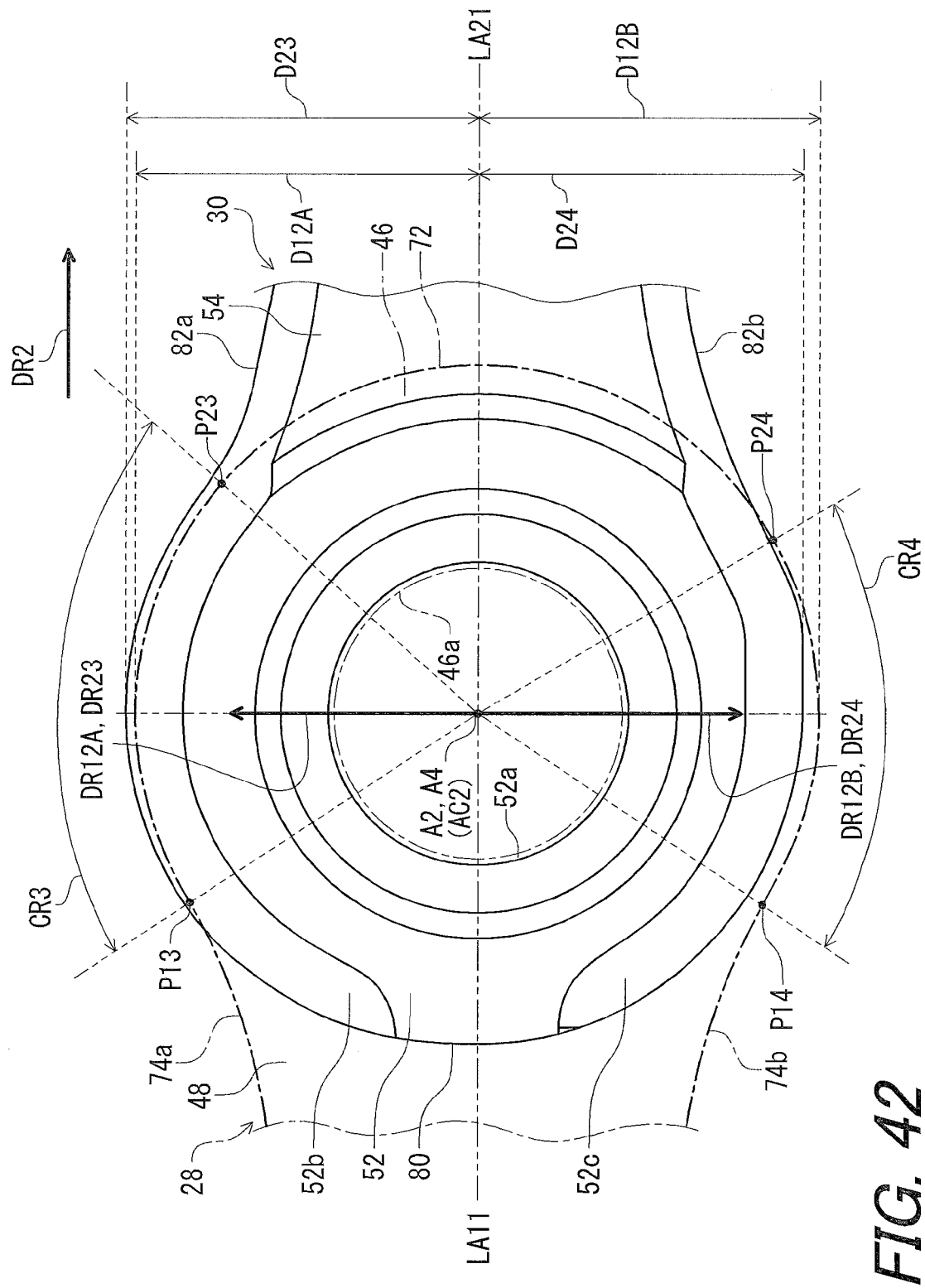
FIG. 42 is an outside partial elevational view of the first outer link plate and the first inner link plate.

Referring to FIG. 42, the second outer-link distance D12A is defined from the second center axis A2 to the second end edge 72 in the third direction DR23 in a state where the first inner-link longitudinal axis LA21 is parallel to the first outer-link longitudinal axis LA11. The second outer-link distance D12B is defined from the second center axis A2 to the second end edge 72 in the fourth direction DR24 in a state where the first inner-link longitudinal axis LA21 is parallel to the first outer-link longitudinal axis LA11.

Referring to FIG. 42, the fourth end portion 52 of the first inner link plate 30 protrudes from the second end portion 46 of the first outer link plate 28 in the third direction DR23 (the direction DR12A) within a third circumferential range CR3 defined between the third point P13 and the third point P23. It will be apparent to those skilled in the bicycle field that the third inner-link distance D23 and the second outer-link distance D12A can be defined within the third circumferential range CR3. The second end portion 46 of the first outer link plate 28 protrudes from the fourth end portion 52 of the first inner link plate 30 in the fourth direction DR24 (the direction DR12B) within a fourth circumferential range CR4 defined between the fourth point P14 and the fourth point P24. It will be apparent to those skilled in the bicycle field that the fourth inner-link distance D24 and the second outer-link distance D12B can be defined within the fourth circumferential range CR4.

Figure 43:
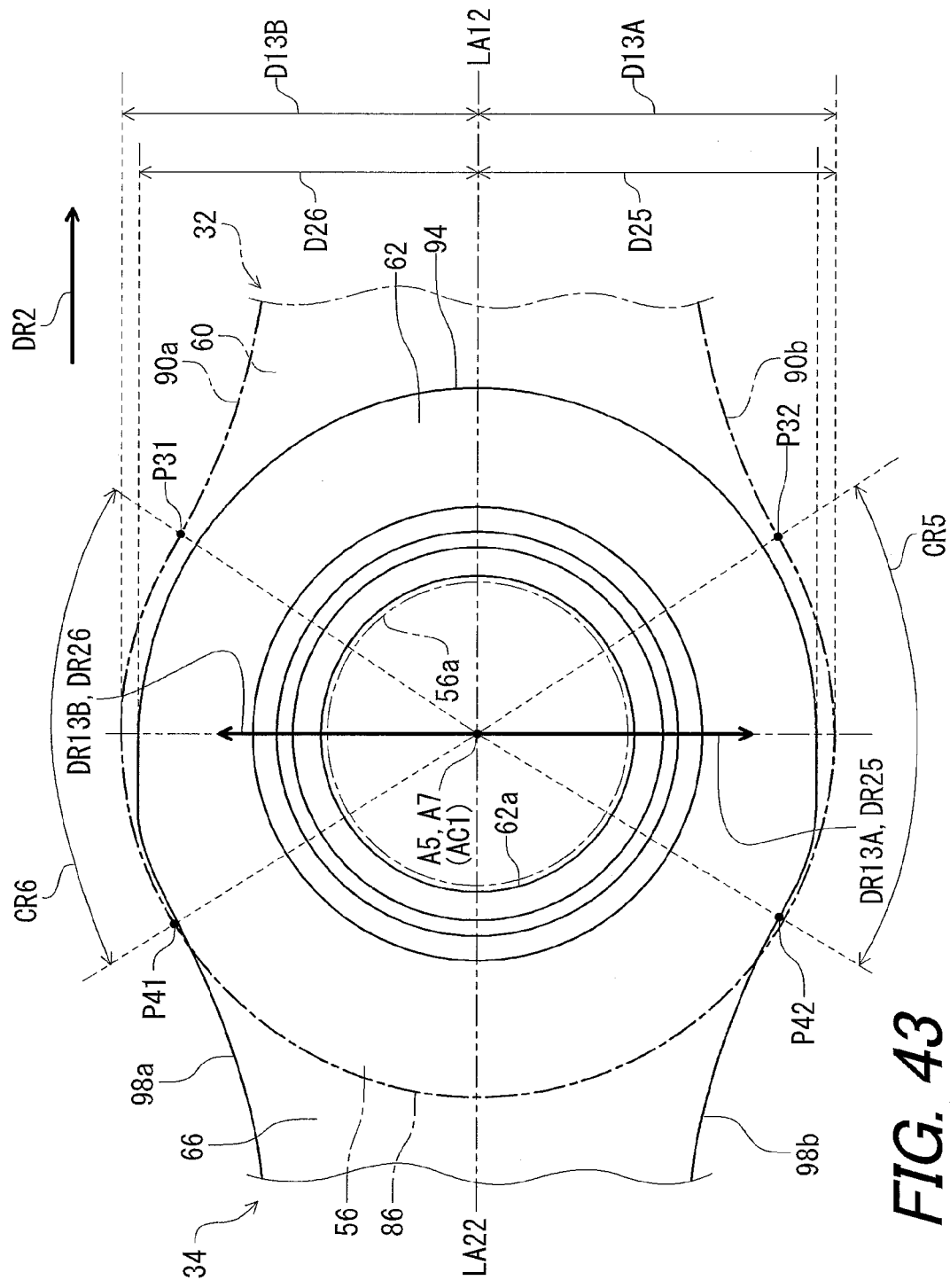
FIG. 43 is an outside partial elevational view of the second outer link plate and the second inner link plate.

Referring to FIG. 43, the third outer-link distance D13A is defined from the fifth center axis A5 to the fifth end edge 86 in the direction DR13A in a state where the second inner-link longitudinal axis LA22 is parallel to the second outer-link longitudinal axis LA12. The third outer-link distance D13B is defined from the fifth center axis A5 to the fifth end edge 86 in the direction DR13B in a state where the second inner-link longitudinal axis LA22 is parallel to the second outer-link longitudinal axis LA12.

Referring to FIG. 43, the fifth end portion 56 of the second outer link plate 32 protrudes from the seventh end portion 62 of the second inner link plate 34 in the fifth direction DR25 (the direction DR13A) within a fifth circumferential range CR5 defined between the second point P32 and the second point P42. It will be apparent to those skilled in the bicycle field that the fifth inner-link distance D25 and the third outer-link distance D13A can be defined within the fifth circumferential range CR5. The fifth end portion 56 of the second outer link plate 32 protrudes from the seventh end portion 50 of the second inner link plate 34 in the sixth direction DR26 (the direction DR13B) within a sixth circumferential range CR6 defined between the first point P31 and the first point P41. It will be apparent to those skilled in the bicycle field that the sixth inner-link distance D26 and the third outer-link distance D13B can be defined within the sixth circumferential range CR6. Since the relationship between the sixth end portion 58 and the eighth end portion 64 is the same as the relationship between the fifth end portion 56 and the seventh end portion 62, the depiction of FIG. 43 can be applied to the relationship between the fifth end portion 56 and the seventh end portion 62, and it will not be described in detail herein.

Figure 45:
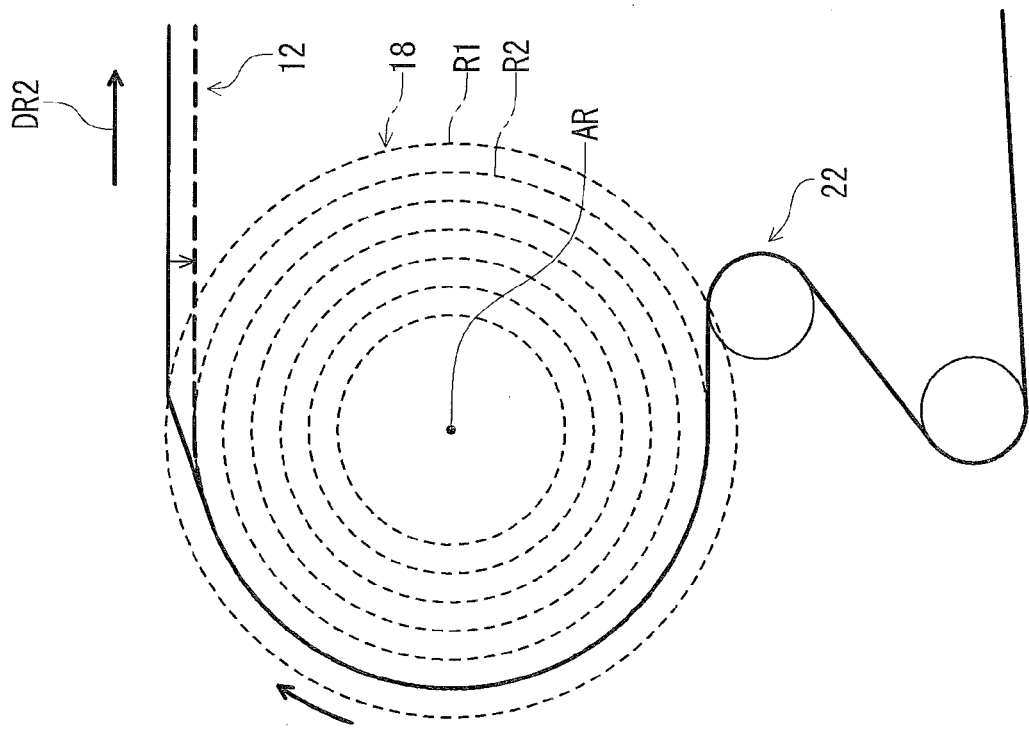
FIG. 45 is a schematic diagram for explaining a shifting operation of the bicycle chain.
Figure 44:
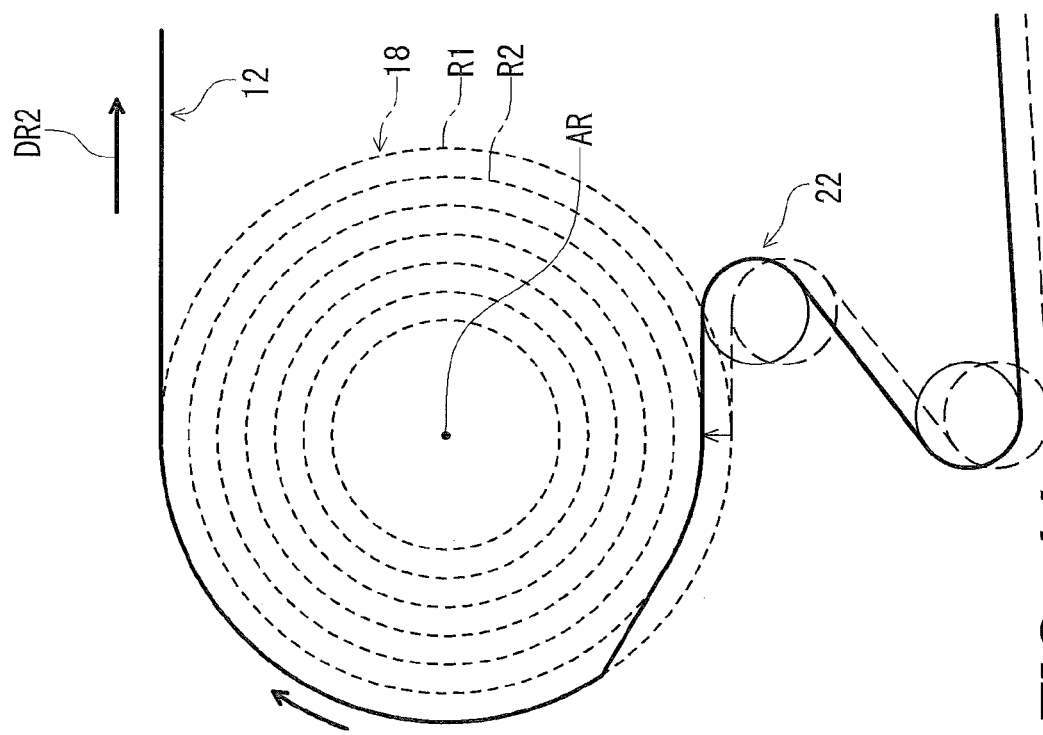
FIG. 44 is a schematic diagram for explaining a shifting operation of the bicycle chain.

Referring to FIGS. 44 to 46, the shifting operation of the bicycle chain 12 will be described below.

As illustrated in FIG. 44, the rear derailleur 22 changes a transverse position of the bicycle chain 12 in a lower area of the bicycle rear sprocket 18 from a state where the bicycle chain 12 engages with the first rear sprocket R1 of the bicycle rear sprocket 18. More specifically, the rear derailleur 22 changes the transverse position of the bicycle chain 12 from a position corresponding to the first rear sprocket R1 to a position corresponding to the second rear sprocket R2. This causes a part of the bicycle chain 12 to be engaged with the second rear sprocket R2 in the lower area of the bicycle rear sprocket 18.

As illustrated in FIG. 45, when the bicycle rear sprocket 18 further rotates, the engaged part of the bicycle chain 12 moves to an upper area of the second rear sprocket R2. This causes the bicycle chain 12 to be engaged with the second rear sprocket R2 from the upper area of the bicycle rear sprocket 18 to the lower area of the bicycle rear sprocket 18. As illustrated with a solid line in FIG. 45, a part of the bicycle chain 12 is still engaged with the first rear sprocket R1. As illustrated with a dashed line in FIG. 45, when the bicycle rear sprocket 18 further rotates, the part of the bicycle chain 12 is released from the engaged tooth of the first rear sprocket R1, causing the bicycle chain 12 to be completely engaged with the second rear sprocket R2.

Figure 48:
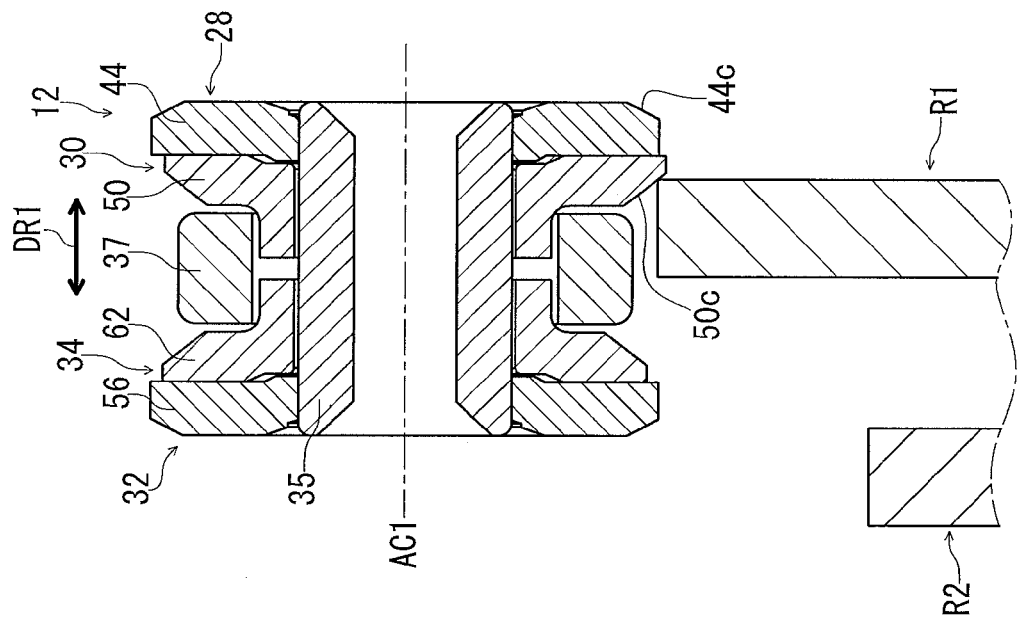
FIG. 48 is a partial cross sectional view of the bicycle rear sprocket with the bicycle chain taken along line XLVIII-XLVIII of FIG. 46.

Referring to FIGS. 46 and 48, in a state where a part of the bicycle chain 12 is still engaged with the first rear sprocket R1, a tooth T1 of the first rear sprocket R1 is inserted between the first outer link plate 28 and the second outer link plate 32. In FIG. 46, the hatched areas indicate portions at which the first rear sprocket R1 or the second rear sprocket R2 is meshed with the bicycle chain 12. When the bicycle rear sprocket 18 further rotates, the first inner link plate 30 slides with the first rear sprocket R1 to move toward the second rear sprocket R2. As illustrated in FIG. 48, the third end portion 50 of the first inner link plate 30 slides with the first rear sprocket R1 when the bicycle chain 12 moves toward the second rear sprocket R2 across the first rear sprocket R1. More specifically, the third chamfer 50c of the third end portion 50 slides with an outer edge of the first rear sprocket R1.

Figure 49:
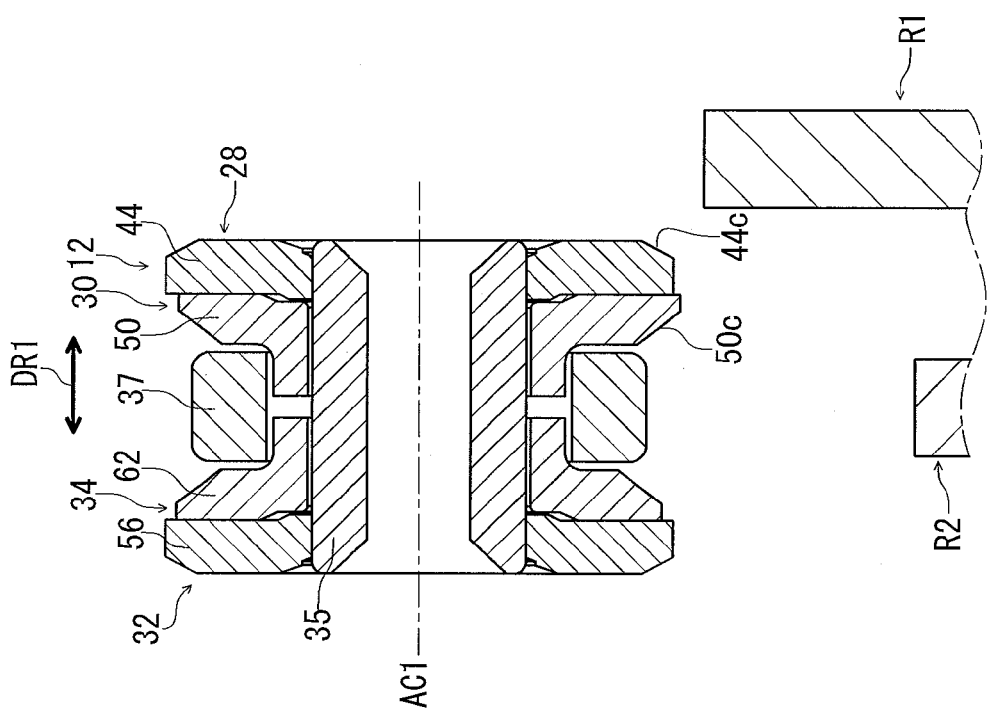
FIG. 49 is a partial cross sectional view of the bicycle rear sprocket with the bicycle chain taken along line XLIX-XLIX of FIG. 47.

Referring to FIGS. 47 and 49, after the bicycle chain 12 crosses the first rear sprocket R1, the bicycle chain 12 is completely engaged with the second rear sprocket R2.

Since the first inner-link distance D21 of the third end portion 50 is larger than the first outer-link distance D11A, the third end portion 50 of the first inner link plate 30 reduces the interference between the first end portion 44 of the first outer link plate 28 and the first rear sprocket R1 when the bicycle chain 12 crosses the first rear sprocket R1. This improves smooth shifting operations of the bicycle chain 12.

Furthermore, since the first inner-link distance D21 of the third end portion 50 is larger than the second inner-link distance D22, the weight-increase of the bicycle chain 12 can be prevented.

In the above embodiments, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers in the terms "first end portion", "second end portion", "third end portion", "first end edge", "second end edge", "third end edge" or the like recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle chain comprising:
   a first outer link plate comprising:
      a first end portion including a first opening having a first center axis;
      a second end portion including a second opening having a second center axis;
      a first intermediate portion interconnecting the first end portion and the second end portion, the first end portion, the second end portion and the first intermediate portion defining a first outer peripheral edge comprising:
         a first end edge extending about the first end portion;
         a second end edge extending about the second end portion; and
         a pair of first intermediate edges extending along the first intermediate portion between the first end edge and the second end edge, a first outer-link distance being defined from the first center axis to the first end edge;
   a first inner link plate comprising:
      a third end portion including a third opening having a third center axis;
      a fourth end portion including a fourth opening having a fourth center axis;
      a second intermediate portion interconnecting the third end portion and the fourth end portion, the third end portion, the fourth end portion and the second intermediate portion defining a second outer peripheral edge comprising:
         a third end edge extending about the third end portion;
         a fourth end edge extending about the fourth end portion; and
         a pair of second intermediate edges extending along the second intermediate portion between the third end edge and the fourth end edge, a first inner-link distance being defined from the third center axis to a first location on the third end edge, a second inner-link distance being defined from the third center axis to a second location on the third end edge, the first inner-link distance being larger than the second inner-link distance and the first outer-link distance; and
   a first link pin configured to extend through the first opening and the third opening to rotatably couple the first end portion and the third end portion.

2. The bicycle chain according to claim 1, wherein
   the first inner-link distance is defined from the third center axis to the third end edge in a first direction which radially outwardly extends from the third center axis,
   the second inner-link distance is defined from the third center axis to the third end edge in a second direction which radially outwardly extends from the third center axis, and
   the second direction is different from the first direction.

3. The bicycle chain according to claim 2, wherein
the first outer link plate has a first outer-link longitudinal axis perpendicular to the first center axis and the second center axis,
the first inner link plate has a first inner-link longitudinal axis perpendicular to the third center axis and the fourth center axis, and
the first outer-link distance is defined from the first center axis to the first end edge in the first direction in a state where the first inner-link longitudinal axis is parallel to the first outer-link longitudinal axis.

4. The bicycle chain according to claim 3, wherein
the first direction is perpendicular to the first inner-link longitudinal axis.

5. The bicycle chain according to claim 2, wherein
the first direction is opposite to the second direction with respect to the third center axis.

6. The bicycle chain according to claim 2, wherein
a second outer-link distance is defined from the second center axis to the second end edge,
a third inner-link distance is defined from the fourth center axis to a first location on the fourth end edge,
a fourth inner-link distance is defined from the fourth center axis to a second location on the fourth end edge, and
the third inner-link distance is larger than the fourth inner-link distance and the second outer-link distance.

7. The bicycle chain according to claim 6, wherein
the third inner-link distance is defined from the fourth center axis to the fourth end edge in a third direction which radially outwardly extends from the fourth center axis,
the fourth inner-link distance is defined from the fourth center axis to the fourth end edge in a fourth direction which radially outwardly extends from the fourth center axis, and
the fourth direction is different from the third direction.

8. The bicycle chain according to claim 7, wherein
the first outer link plate has a first outer-link longitudinal axis perpendicular to the first center axis and the second center axis,
the first inner link plate has a first inner-link longitudinal axis perpendicular to the third center axis and the fourth center axis, and
the second outer-link distance is defined from the second center axis to the second end edge in the third direction in a state where the first inner-link longitudinal axis is parallel to the first outer-link longitudinal axis.

9. The bicycle chain according to claim 8, wherein
the third direction is perpendicular to the first inner-link longitudinal axis.

10. The bicycle chain according to claim 9, wherein
the first direction is defined on a first side with respect to the first inner-link longitudinal axis,
the third direction is defined on a second side with respect to the first inner-link longitudinal axis, and
the second side is opposite to the first side with respect to the first inner-link longitudinal axis.

11. The bicycle chain according to claim 10, wherein
the first direction is opposite to the third direction with respect to the first inner-link longitudinal axis.

12. The bicycle chain according to claim 7, wherein
the third direction is opposite to the fourth direction with respect to the fourth center axis.

13. The bicycle chain according to claim 1, further comprising:
a second outer link plate comprising:
a fifth end portion including a fifth opening having a fifth center axis;
a sixth end portion including a sixth opening having a sixth center axis; and
a third intermediate portion interconnecting the fifth end portion and the sixth end portion, the fifth end portion, the six end portion and the third intermediate portion defining a third outer peripheral edge comprising:
a fifth end edge extending about the fifth end portion;
a sixth end edge extending about the sixth end portion; and
a pair of third intermediate edges extending along the third intermediate portion between the fifth end edge and the sixth end edge; and
a second inner link plate comprising:
a seventh end portion including a seventh opening having a seventh center axis;
an eighth end portion including an eighth opening having an eighth center axis; and
a fourth intermediate portion interconnecting the seventh end portion and the eighth end portion, the seventh end portion, the eighth end portion and the fourth intermediate portion defining a fourth outer peripheral edge comprising:
a seventh end edge extending about the seventh end portion;
an eighth end edge extending about the eighth end portion; and
a pair of fourth intermediate edges extending along the fourth intermediate portion between the seventh end edge and the eighth end edge, wherein
the first link pin is configured to extend through the fifth opening and the seventh opening to rotatably couple the fifth end portion and the seventh end portion.

14. The bicycle chain according to claim 13, wherein
the first outer link plate and the first inner link plate are configured to be positioned closer to a bicycle frame than the second outer link plate and the second inner link plate respectively in a state where the bicycle chain engages with a bicycle rear sprocket.

15. The bicycle chain according to claim 14, wherein
the third end portion of the first inner link plate is positioned downstream of the fourth end portion of the first inner link plate with respect to a chain driving direction in a state where the bicycle chain engages with the bicycle rear sprocket.

16. The bicycle chain according to claim 14, wherein
the first inner-link distance is defined from the third center axis to the third end edge in a first direction which radially outwardly extends from the third center axis,
the second inner-link distance is defined from the third center axis to the third end edge in a second direction which radially outwardly extends from the third center axis, and
the second direction is different from the first direction.

17. The bicycle chain according to claim 16, wherein
the first direction is directed radially inwardly with respect to a rotation axis of the bicycle rear sprocket in a state where the bicycle chain engages with the bicycle rear sprocket.

18. The bicycle chain according to claim 17, wherein
the third end portion of the first inner link plate is positioned downstream of the fourth end portion of the first inner link plate with respect to a chain driving direction in a state where the bicycle chain engages with the bicycle rear sprocket.

19. The bicycle chain according to claim 16, wherein
the first outer link plate has a first outer-link longitudinal axis perpendicular to the first center axis and the second center axis,
the first inner link plate has a first inner-link longitudinal axis perpendicular to the third center axis and the fourth center axis, and
the first outer-link distance is defined from the first center axis to the first end edge in the first direction in a state where the first inner-link longitudinal axis is parallel to the first outer-link longitudinal axis.

20. The bicycle chain according to claim 19, wherein
the first direction is perpendicular to the first inner-link longitudinal axis.

21. The bicycle chain according to claim 13, wherein
a third outer-link distance is defined from the fifth center axis to the fifth end edge,
a fifth inner-link distance is defined from the seventh center axis to the seventh end edge, and
the fifth inner-link distance is smaller than or equal to the third outer-link distance.

22. The bicycle chain according to claim 21, wherein
the first outer link plate and the first inner link plate are configured to be positioned closer to a bicycle frame than the second outer link plate and the second inner link plate respectively in a state where the bicycle chain engages with a bicycle rear sprocket.

23. The bicycle chain according to claim 13, wherein
the second inner-link distance is smaller than or equal to the first outer-link distance.

24. The bicycle chain according to claim 1, wherein
the second inner-link distance is smaller than or equal to the first outer-link distance.

\* \* \* \* \*